United States Patent [19]
Asaka

[11] Patent Number: 6,028,988
[45] Date of Patent: Feb. 22, 2000

[54] SYSTEM FOR LOGIC SYNTHESIS-FOR-TESTABILITY CAPABLE OF IMPROVING TESTABILITY FOR AN FSM HAVING AN ASYNCHRONOUS RESET STATE

[75] Inventor: Toshiharu Asaka, Tokyo, Japan

[73] Assignee: NEC Corporation, Tokyo, Japan

[21] Appl. No.: 08/967,047

[22] Filed: Nov. 10, 1997

[30] Foreign Application Priority Data

Nov. 11, 1996 [JP] Japan .................................. 8-298401

[51] Int. Cl.⁷ .................................................. G06F 17/50
[52] U.S. Cl. .............................. 395/500.05; 395/500.03; 395/500.19
[58] Field of Search ........................... 395/500.02–500.19

[56] References Cited

U.S. PATENT DOCUMENTS

| 5,394,347 | 2/1995 | Kita et al. ........................... | 395/500.23 |
| 5,461,573 | 10/1995 | Chakradhar et al. .............. | 395/500.05 |
| 5,515,292 | 5/1996 | Roy et al. ........................... | 395/500.03 |
| 5,703,885 | 12/1997 | Sun et al. ........................... | 395/500.05 |
| 5,870,590 | 2/1999 | Kita et al. ........................... | 395/500.05 |

OTHER PUBLICATIONS

Chu ("CLASS: a CAD system for automatic synthesis and verification of asynchronous finite state machines", Integration, The VLSI Journal, vol. 15, No. 3, pp. 263–289, Oct. 1, 1993).

Yun et al. ("Unifying synchronous/asynchronous state machine synthesis", 1993 IEEE/ACM International Conference on Computer–Aided Design, ICCAD–93, pp. 255–260, Nov. 7, 1993).

Hsu et al. ("A distance reduction approach to design for testability", Proceedings of 13th IEEE VLSI Test Symposium, pp. 158–163, Jan. 1, 1995).

Frank F. Hsu et al., "A Distance Reduction Approach to Design for Testability", *1995 IEEE*, pp. 158–163, Jan. 1, 1995.

*Primary Examiner*—Kevin J. Teska
*Assistant Examiner*—Phallaka Kik
*Attorney, Agent, or Firm*—Sughrue, Mion, Zinn, Macpeak & Seas, PLLC

[57] ABSTRACT

In a logic synthesis-for-testability system including a memory unit (101) for memorizing, as an objective circuit description which is logically synthesized, an FSM (finite state machine) description having a plurality of states, a testability improving unit (106) includes a candidate selecting unit (111) for selecting candidate states among the plurality of states with an asynchronous reset state of the plurality of states excluded from the candidate states. The testability improving unit improves a testability of the FSM description by reducing an average distance between all pairs of the plurality of states by selecting (112) a center state from the candidate states and providing (113) the FSM description with new transitions, each of which is directed to the center state from each of the plurality of states other than the center state. The candidate selecting unit may select the candidate states among the plurality of states with the asynchronous reset state and near states of the plurality of states excluded from the candidate states. Each of the near states has a distance which is calculated from the asynchronous reset state to each of the near states and which is shorter than a predetermined threshold value.

6 Claims, 17 Drawing Sheets

SYSTEM FOR LOGIC SYNTHESIS-FOR-TESTABILITY CAPABLE OF IMPROVING TESTABILITY FOR AN FSM HAVING AN ASYNCHRONOUS RESET STATE

BACKGROUND OF THE INVENTION:

This invention relates to a system for logic synthesis-for-testability.

A system for logic synthesis-for-testability (SFT) is different from a design-for-testablity typically using scan approach. In the latter, testability of a logic circuit is integrated after completion of a design process of the logic circuit. In contrast, the system for logic synthesis-for-testability executes optimization-for-testability during the design process of the logic circuit, namely, during a logic synthesis process. Thus, the system synthesizes a logic circuit high in fault coverage and easy In test pattern generation with a small area overhead as compared with the design-for-testability.

For example, a conventional logic synthesis-for-testability system is described in an article entitled "A Distance Reduction Approach to Design for Testability" and contributed by F. P. Hsu and J. H. Patel to The 13th IEEE VLSI Test Symposium, Apr. 30–May 3, 1995, pp. 158–163. This system adopts the concept of a center state for a finite state machine (FSM). In the article, it is proposed to use an average distance between all pairs of states as a new testability measure of FSM. Each pair of states includes a current or initial state and a destination state which is a final target state to be reached as a result of transition from the current state. The distance between each pair of states is defined as the minimum number of clock cycles required in transition from the current state to the destination state. When the minimum number is smaller and greater, the pair of states has "a shorter distance" and "a longer distance", respectively.

The average distance can be used as the measure of the testability in FSM because a test pattern length of a sequential circuit synthesized from the FSM is dependent upon the average distance between two states. The test pattern of the sequential circuit comprises a repetition of a set of a justification sequence, a fault activation sequence, and a distinguish sequence. The justification sequence is an input pattern sequence for transition of an internal state of the sequential circuit from a current internal state to a desired internal state required by the fault activation sequence. The fault activation sequence is an input pattern sequence for propagation of the influence of the fault to flipflops (FF's) or primary output terminals. The distinguish sequence is an input pattern sequence for propagation of the influence of the fault, which has been propagated to FF's by the fault activation sequence, from the FF to the primary output terminals. The internal state of the sequential circuit is represented by a binary-logic vector held by FF's in the sequential circuit. For example, in the sequential circuit with two FFs, the binary-logic vector held by the FFs can take four values "00", "01", "10", and "11" each of which represents a single internal state. In case where the desired internal state required by the fault activation sequence is identical with the current internal state, no justification sequence is required. In case where the influence of the fault is propagated to the primary output terminal by the fault activation sequence, no distinguish sequence is required.

Since one state of FSM corresponds to one internal state of the sequential circuit, transition between the internal states by the justification sequence is equivalent to the transition between the states in the FSM. Therefore, the length of the justification sequence is dependent upon the distance between the states of the FSM. In this connection, the reduction of the distance between the states in the FSM effectively reduces the length of the justification sequence and the test pattern length of the sequential circuit. If the sequential circuit requiring a long justification sequence is given to an automatic test pattern generation program, generation of the test pattern requires an extremely long time. It is assumed that a test program execution period is restricted and that a fault is present which require long CPU time for generating test patterns. In this event, test pattern generation is aborted for that fault and started for another fault. This results in a decrease in number of detected faults and insufficient fault coverage. Therefore, if the distance between states in FSM is reduced, a test pattern, which is short in sequence length and high in fault coverage, can be quickly generated for a synthesized circuit. In other words, the testability is high when the average distance between the states in FSM is small.

In the logic synthesis-for-testability system adopting the center state, the center state is defined as a state with a minimum total distance to other states. By utilizing the fact that the total distance from the center state to the other states is short, the distance can be reduced for a long-distance pair of states by providing the FSM with additional transitions from each of the other states to the center state. In other words, by producing a shorter path through the center state, it is possible to synthesize a sequential circuit which is reduced in distance and improved in testability. Consideration will be directed to three states ST1, ST2, and ST3 in a particular FSM. It is assumed here that the distances from ST1 to ST3, from ST2 to ST3, and from ST2 to ST1 are equal to 1, 3, and 2 or more, respectively. In this event, by providing an additional path or a transition of the distance 1 from ST2 to ST1, a shorter path of the distance 2 is produced from ST2 to ST3 via STI. This is the principle of distance reduction by the use of the center state.

Now, the conventional logic synthesis-for-testability system will be described in detail with reference to the drawing. The FSM is classified into the Mealy machine and the Moore machine. In the former, an primary output logic value is determined by a current state and primary input logic values. In the latter, the primary output logic value is determined only by the current state. The Moore machine can be recognized as one variation of the Mealy machine, in which the primary output logic value is independent from the primary input logic value. Therefore, the description will be directed to the Mealy machine.

Referring to FIG. 1, the conventional logic synthesis-for-testability system comprises a memory unit 101 for holding in the form of circuit description an objective circuit to be synthesized, a technology library used for technology mapping, and constraints such as area and delay of the objective circuit, a library input unit 102 for reading the technology library to make the memory unit 101 hold the technology library, a circuit input unit 103 for reading the circuit description of the objective circuit to make the memory unit 101 hold the objective circuit, a constraint input unit 104 for reading constraints to make the memory unit 101 hold the constraints, an FSM extracting unit 105 for extracting an FSM in case where the objective circuit held in the memory unit 101 is represented in any format other than FSM, a testability improving unit 1101 for improving a testability of the objective circuit held in the memory unit 101 and represented as FSM, a state assigning unit 107 for assigning a binary-logic vector to the state of the objective circuit held in the memory unit 101 and represented by the FSM, an area optimizing unit 108 for optimizing the area of the objective circuit held in the memory unit 101, a delay optimizing unit 109 for optimizing the delay of the objective circuit held in the memory unit 101, and a circuit output unit 110 for producing a resultant circuit obtained as a result of the logic synthesis and held in the memory unit 110.

The testability improving unit 1101 comprises a center state selecting unit 112 for selecting the center state from all states in the FSM as the candidates, an additional transition providing unit 113 for providing the FSM with an additional transition to the center state, a logic providing unit 114 for providing the objective circuit after state assignment with a logic circuit for producing a binary-logic vector assigned to the center state.

Referring to FIG. 2 in addition to FIG. 1, the operation of the conventional logic synthesis-for-testability system will be described.

In a step S201, the library input unit 102 reads the technology library to make the memory unit 101 hold the technology library. In a step S202, the circuit input unit 103 reads the circuit description to make the memory unit 101 hold the circuit description. In a step S203, the constraint input unit 104 reads the constraint to make the memory unit 101 hold the constraint. In a step S204, the FSM extracting unit 105 extracts the FSM in case where the objective circuit held in the memory unit 101 is represented In any format other than FSM and makes the memory unit 101 hold the FSM. In a step S205, the center state selecting unit 112 selects the center state. In a step S206, the transition providing unit 113 provides the transition from each state to the center state. In a step S207, the state assigning unit 107 assigns the binary-logic vector to the state of the FSM held in the memory unit 101. In a step S208, the area optimizing unit 108 executes, upon the circuit held in the memory unit 101, technology-independent area optimization such as two-level or multi-level logic optimization as well as technology-dependent area optimization or technology mapping using the technology library. In a step S209, the delay optimizing unit 109 executes, upon the circuit held in the memory unit 101, technology-independent delay optimization as well as technology-dependent delay optimization or technology mapping using the technology library so as to satisfy the constraints. In a step S210, the circuit output unit 110 produces a net list of a resultant circuit obtained as a result of the logic synthesis and held in the memory unit 110.

Now, description will be made in detail as regards the operation of the testability improving unit 1101 of the conventional logic synthesis-for-testability system.

Table 1 is a state transition table for an FSM as the objective of the testability improving unit 1101. The FSM is free from an asynchronous reset state and comprises two primary input terminals, two primary output terminals, and six states.

TABLE 1

| Primary Input | Current State | Next State | Primary Output | |
|---|---|---|---|---|
| 00 | A | A | 00 | 1301 |
| 01 | A | B | 01 | 1302 |
| 10 | A | C | 10 | 1303 |
| 11 | A | D | 11 | 1304 |
| -0 | B | B | 00 | 1305 |
| -1 | B | E | 11 | 1306 |
| 0- | C | C | 00 | 1307 |

TABLE 1-continued

| Primary Input | Current State | Next State | Primary Output | |
|---|---|---|---|---|
| 1- | C | E | 10 | 1308 |
| -0 | D | D | 00 | 1309 |
| -1 | D | F | 01 | 1310 |
| 0- | E | E | 00 | 1311 |
| 1- | E | A | 11 | 1312 |
| -0 | F | F | 00 | 1313 |
| -1 | F | C | 10 | 1314 |

("-" represents "don't care" whichever one of 0 and 1 is taken)

Referring to FIG. 3, a state transition graph includes the six states A through F of the FSM and transitions 301 through 314 between the states A through F. A pair of values separated by "/" (slash) and affixed to each transition represent the primary input logic value as a condition of triggering the transition and the primary output logic value upon occurrence of the transition. These values are described in the form of "primary input logic value/primary output logic value". The transition 303 labelled "01/01" represents that, when the logic value "01" is supplied to the primary input terminal while the state A is a current state, the transition from the current state A to the state B occurs in response to a next clock to produce the logic value "01" to the primary output terminal. The transition 303 is equivalent to the transition 1302 in Table 1. The similar description applies to other transitions.

Referring to FIG. 4, the operation of the center state selecting unit 112 will be described. In a step S601, the distance between each pair of states is calculated. The result is shown in Table 2.

TABLE 2

| | | Destination State | | | | | |
|---|---|---|---|---|---|---|---|
| | | A | B | C | D | E | F |
| Current State | A | 1 | 1 | 1 | 1 | 2 | 2 |
| | B | 2 | 1 | 3 | 3 | 1 | 4 |
| | C | 2 | 3 | 1 | 3 | 1 | 4 |
| | D | 4 | 5 | 2 | 1 | 3 | 1 |
| | E | 1 | 2 | 2 | 2 | 1 | 3 |
| | F | 3 | 4 | 1 | 4 | 2 | 1 |

In Table 2, the distance from the current state to the destination state is shown at a crosspoint of each row and each column. In the following, the crosspoint is represented by a pair of the current state and the destination state enclosed in parentheses in this order. From the state A to the state B, the transition 303 takes place in one clock. Therefore, a crosspoint (A, B) is equal to 1 in Table 2. From the state A to the state E, the shortest path of two clocks is composed of the transition 303 from the state A to the state B and the transition 306 from the state B to the state E. Therefore, a crosspoint (A, E) is equal to 2 in Table 2. In a similar manner, the distances are obtained for the other pair of states. The average distance is equal to 2.16. In a step S602, the distance to itself is made to be equal to zero. The result is shown in Table 3.

TABLE 3

|  |  | Destination State |  |  |  |  |  |  |
|---|---|---|---|---|---|---|---|---|
|  |  | A | B | C | D | E | F | SUM |
| Current | A | 0 | 1 | 1 | 1 | 2 | 2 | 7 |
| State | B | 2 | 0 | 3 | 3 | 1 | 4 | 13 |
|  | C | 2 | 3 | 0 | 3 | 1 | 4 | 13 |
|  | D | 4 | 5 | 2 | 0 | 3 | 1 | 15 |
|  | E | 1 | 2 | 2 | 2 | 0 | 3 | 10 |
|  | F | 3 | 4 | 1 | 4 | 2 | 0 | 14 |

As compared with Table 2, the crosspoint (A, A) has a value 0. Each of the crosspoints (B, B), (C, C), (D, D), (E, E), and (F, F) also has a value 0. In a step S603, the total distance of each state to the other state is calculated. The result is shown in a column labelled SUM in Table 3. For example, the total distance from the state A to the other states is 7. In a step S604, one of the states A through F that has a minimum total distance is selected as the center state. From Table 3, the state A having a minimum total distance is selected as the center state.

Next, the transition providing unit 113 provides additional transitions from the all states to the center state to improve the testability by reduction of the distances. Referring to FIG. 5, the operation of the transition providing unit 113 will be described.

In a step S1701, a center state controlling primary input terminal is added to the circuit. The center state controlling primary input terminal is for controlling the transitions in the FSM. When one logic value of a binary logic is supplied to the center state controlling input terminal, transitions similar to those in the original FSM take place in accordance with the logic values of the other primary input terminals. When the other logic value of the binary logic is supplied, transitions to the center state occur irrespective of the logic values of the other primary input terminals. Herein, the transitions similar to those of the original FSM and the transitions to the center state are performed when the center state controlling primary input terminal has a logic value "0" and a logic value "1", respectively. In a step S1702, the logic values of the primary input terminals as transition conditions are modified. Specifically, the logic value "0" of the center state controlling primary input terminal corresponding to the transitins similar to those of the original FSM is added to the logic values of the primary input terminals as the transitions conditions.

In a step S1703, when the center state controlling primary input terminal has the logic value "1", the transitions to the center state are added which occur irrespective of the logic values of the other primary input terminals.

Table 4 is a state transition table of the FSM after completion of the operation of the transition providing unit 113 and shows transition conditions for transitions 1801 through 1820. A state transition graph of the FSM is illustrated in FIG. 6 in which transitions 1901 through 1918 are illustrated among the states A through F.

TABLE 4

| Center State Controlling Primary Input | Primary Input | Current State | Next State | Primary Output |  |
|---|---|---|---|---|---|
| 0 | 00 | A | A | 00 | 1801 |
| 0 | 01 | A | B | 01 | 1802 |
| 0 | 10 | A | C | 10 | 1803 |

TABLE 4-continued

| Center State Controlling Primary Input | Primary Input | Current State | Next State | Primary Output |  |
|---|---|---|---|---|---|
| 0 | 11 | A | D | 11 | 1804 |
| 0 | –0 | B | B | 00 | 1805 |
| 0 | –1 | B | E | 11 | 1806 |
| 0 | 0– | C | C | 00 | 1807 |
| 0 | 1– | C | E | 10 | 1808 |
| 0 | –0 | D | D | 00 | 1809 |
| 0 | –1 | D | F | 01 | 1810 |
| 0 | 0– | E | E | 00 | 1811 |
| 0 | 1– | E | A | 11 | 1812 |
| 0 | –0 | F | F | 00 | 1813 |
| 0 | –1 | F | C | 10 | 1814 |
| 1 | — | A | A | — | 1815 |
| 1 | — | B | A | — | 1816 |
| 1 | — | C | A | — | 1817 |
| 1 | — | D | A | — | 1818 |
| 1 | — | E | A | — | 1819 |
| 1 | — | F | A | — | 1820 |

In the step 1701 (FIG. 5), the transition 1302 (Table 1) is modified into the transition 1802 (Table 4) by addition of the condition that the center state controlling primary input terminal has a logic "0" value. The transition 1802 is equivalent to the transition 1902 (FIG. 6). Similar description also applies to the others. In the step S1702, the transitions 1815 through 1820 are added. The transition 1816 represents that, if the current state is the state B and the center state controlling primary input terminal has the logic "1" value, the transition occurs to the state A selected as the center state. Similar description also applies to the others. Herein, the logic values of the primary output terminals upon the transition to the center state is not particularly specified but is left as "don't care". However, certain logical values may be specified. If "don't care " is selected, output logic values are assigned at the area optimizing unit 108 in a later stage. The transitions 1816 and 1915 are equivalent to each other. The transitions 1801 and 1815 are coincident with each other in both of the current and the next states and, therefore, are collectively described in the state transition graph in FIG. 6 as the single transition 1901. Likewise, the transitions 1812 and 1819 are also collectively described In the figure as the single transition 1911.

In order to confirm the effect of the above-mentioned process, the distances among the states are calculated for the FSM obtained by Table 4. The result of calculation is given in Table 5.

TABLE 5

|  |  | Destination State |  |  |  |  |  |
|---|---|---|---|---|---|---|---|
|  |  | A | B | C | D | E | F |
| Current | A | 1 | 1 | 1 | 1 | 2 | 2 |
| State | B | 1 | 2 | 1 | 2 | 1 | 3 |
|  | C | 1 | 2 | 1 | 2 | 1 | 3 |
|  | D | 1 | 2 | 2 | 1 | 3 | 1 |
|  | E | 1 | 2 | 2 | 2 | 1 | 3 |
|  | F | 1 | 2 | 1 | 2 | 2 | 1 |

For example, the distance from the state D to the state B shown at (D, B) which is a crosspoint of row D and column B is equal to 5 in Table 2 while the distance at (D, B) is equal to 2 in Table 5. Thus, addition of the transitions to the center state reduces the distance. The average distance is equal to 2.16 in Table 2 while it is equal to 1.16 in Table 5. Thus, it is confirmed that the distance is reduced and the testability is improved.

Next referring to FIG. 7, the operation of the conventional logic synthesis-for-testability system using the logic providing unit 114 will be described. The logic providing unit 114 provides a logic circuit to the sequential circuit after assignment of the states in the FSM and thereby achieves the effect equivalent to the addition of the transitions to the center state to the FSM.

Unlike the case described in conjunction with FIG. 2, the operation of the center state selecting unit 112 is followed by the operation of the state assigning unit 107, after which the logic providing unit 114 is applied. Thus, the transition providing unit 113 is not applied.

Steps S201 through S205 up to the operation of the center state selecting unit 112 are similar to those described in conjunction with FIG. 2 and therefore will not be described any longer. Then, in a step S207, the state assigning unit 107 assigns the binary-logic vector of the internal state to each state. The state assignment is a well-known technique and will not be described in detail.

Referring to FIG. 8, the state assigning unit 107 produces a resultant sequential circuit. In order to express the six states, three FFs are produced. This is because the number of the internal states which can be expressed by the FFs is equal to 2 to the n-th power where n represents the number of the FFs. Therefore, the minimum number of the FFs which can express the six states is equal to 3. The state assigning unit 107 converts the FSM into the sequential circuit expressed by a combinational circuit 2201, FFs 2202 through 2204 for holding internal states, FF output logic values 2205 through 2207, FF data input logic values 2208 through 2210 for producing bits of the internal state as the FF input logic values, an FF clock 2211, primary input terminals 2212, and primary output terminals 2213, as illustrated in FIG. 8. The combinational circuit 2201 is responsive to logic values of the primary input terminals 2212 and the FF output logic values 2205 through 2207 and produces logic values of the primary output terminals 2213 and the FF data input logic values 2208 through 2210.

Referring to FIG. 9, the logic providing unit 114 is applied to the sequential circuit in FIG. 8 to produce a resultant circuit illustrated in FIG. 10.

It is assumed that the state assigning unit 107 assigns a binary-logic vector "010" as the internal state to the state A selected by the center state selecting unit 112. Specifically, the situation where the FFs 2202, 2203, and 2204 hold the logic "0" value, the logic "1" value, and the logic "0" value, respectively, is equivalent to the state A. Therefore, let the circuit be modified so that the FFs 2202 through 2204 are supplied with the FF data input logic values 2208 through 2210 and the binary-logic vector "010" when the logic "0" value and the logic "1" value are supplied to the center state controlling input terminal, respectively. In this event, the effect is equivalent to the case where the transitions to the center state are provided.

In a step S2301, the center state controlling primary input terminal 2401 is added to the circuit. In a step S2302, judgement is made about presence or absence of any unprocessed FF. In presence of any unprocessed FF, the operation proceeds to a step S2303. In absence of any unprocessed FF, the operation of the logic providing unit 114 is finished. In the step S2303, one unprocessed FF is extracted to be processed as a processed FF. Herein, it is assumed that the FF 2202 is extracted. In a step S2304, judgement is made about the logic value of the center state assigned to the FF. If the logic "0" value is assigned, the operation proceeds to a step S2305. If the logic "1" value is assigned, the operation proceeds to a step S2308. In this case, the FF 2202 is assigned with the logic "0" value so that the operation proceeds to the step S2305. In the step S2305, judgement is made about presence or absence of a NOT gate producing an inverted logic of the center state controlling primary input terminal. In presence of the NOT gate, the operation proceeds to a step S2307. In absence of the NOT gate, the operation proceeds to a step S2306. In this case, the NOT gate is absent so that the operation proceeds to the step S2306. In the step S2306, the NOT gate 2402 producing the inverted logic of the center state controlling primary input terminal is added to the circuit and an input terminal of the NOT gate 2402 is connected to the center state controlling primary input terminal 2401. In the step S2307, a two-input AND gate 2403 is added. One input terminal and the other input terminal of the two-input AND gate 2403 are connected to an output terminal of the NOT gate 2402 and to the FF data input logic value 2208, respectively. The FF data input logic value 2208 is disconnected from a data input terminal of the FF 2202. An output terminal of the two-input AND gate 2403 is connected to the data input terminal of the FF 2202. Then, the operation proceeds to the step S2302. By the above-mentioned modification, the input logic value to the data input terminal of the FF 2202 is given by:

(Center State Controlling Input Terminal 2401)* (FF Data Input Logic Value 2208), where * represents a logical multiplication. Thus, a desired logic value is supplied to the FF 2202.

Next it is assumed that the FF 2203 is selected in the step S2303. In the step S2304, judgement is made about the logic value of the center state assigned to the FF. Since the logic "1" value is assigned to the FF 2203, the operation proceeds to the step 2308. In the step 2308, a two-input OR gate 2404 is added. One input terminal and the other input terminal of the two-input OR gate 2404 are connected to the center state controlling primary input terminal 2401 and the FF data input logic value 2209, respectively. The FF data input logic value 2209 is disconnected from a data input terminal of the FF 2203. An output terminal of the two-input OR gate 2404 is connected to the data input terminal of the FF 2203. By the above-mentioned modification, the input logic value to the data input terminal of the FF 2203 is given by:

(Center State Controlling Input Terminal 2401)+(FF Data Input Logic 2209), where + represents a logical addition. Thus, a desired logic value is supplied to the FF 2203.

For the FF 2204, the operation is similar to that described in conjunction with the FF 2202 except that the step S2305 proceeds to the step S2307 because the NOT gate 2402 already exists. Therefore, description is omitted herein.

In the foregoing, the logic circuit is achieved which produces the binary-logic vector as the internal state assigned to the center state by the use of the logic elements. In practical application, use may be made of actual elements in the technology library 202 used in technology mapping of the area optimizing unit 108 and the delay optimizing unit 109. Alternatively, the logic itself independent from the technology library 202 may be inserted.

In the foregoing, the operation of the testability providing unit is executed immediately after the operation of the state assigning unit 107. Alternatively, the operation of the testability providing unit may be executed during the operations of the area optimizing unit 108 and the delay optimizing unit 109 later executed by the logic synthesis. However, the operation must precede the application of delay optimization utilizing a retiming technique in which delay optimization is performed by moving the FF across the combinational circuit. This is because the retiming technique modifies the number of the FFs in the circuit and the FF data input logic values so that the internal state equivalent to the center state is changed from the binary-logic vector assigned by the state assigning unit 107 to another binary-logic vector.

The logic synthesis-for-testability system utilizing the center state is addressed to the FSM. In case of a sequential circuit expressed in a different format other than the FSM, such as a net list, the FSM extracting unit 105 extracts the FSM from the sequential circuit. Then, the above-mentioned system is applied to the FSM thus extracted.

The conventional logic synthesis-for-testability system is disadvantageous in that, in case where the asynchronous reset state or the state at a short distance from the asynchronous reset state is selected as the center state, the effect of testability improvement is not obtained or insufficient even if it is obtained.

This is because the asynchronous reset state functionally allows transition from all the states so that, even if new transitions to the asynchronous reset state are added, the distances among the states can not be shortened at all. In case of the state at a short distance from the asynchronous reset state, the effect of reducing the distances is insufficient because of existing paths through the asynchronous reset state.

FIG. 11 shows a state transition graph where the state A of the FSM in FIG. 3 is an asynchronous reset state. An asynchronous reset transition 315 represents that, in case where an asynchronous reset controlling primary input terminal RST has the logic "1" value, the transition to the state A which is the asynchronous reset state occurs irrespective of the other primary input terminals and the clocks. Calculation is made of the distances in the FSM. The result of calculation is shown in Table 6.

TABLE 6

|  |  | Destination State | | | | | |
|---|---|---|---|---|---|---|---|
|  |  | A | B | C | D | E | F |
| Current | A | 1 | 1 | 1 | 1 | 2 | 2 |
| State | B | 1 | 1 | 2 | 2 | 1 | 3 |
|  | C | 1 | 2 | 1 | 2 | 1 | 3 |
|  | D | 1 | 2 | 2 | 1 | 3 | 1 |
|  | E | 1 | 2 | 2 | 2 | 1 | 3 |
|  | F | 1 | 2 | 1 | 2 | 2 | 1 |

Average Distance = 1.61

For transition into the asynchronous reset state, the number of clocks required is equal to 0 but a single pattern is required. For the sake of convenience, processing is carried out assuming that one clock is required, i.e., the distance is equal to 1. Herein, if the center state is selected by the use of the conventional technique, the state A is selected as the center state. Even if the transitions to the center state are added, the distances are not reduced and the testability is not improved.

SUMMARY OF THE INVENTION

It is an object of this invention to provide a logic synthesis-for-testability system which can improve a testability even for an FSM having an asynchronous reset state by performing effective selection of a center state considering the asynchronous reset state.

According to this invention, there is provided a logic synthesis-for-testability system comprising: a memory unit for memorizing an FSM (finite state machine) description as an objective circuit description which is logically synthesized, the FSM description having a plurality of states; and a testability improving unit connected to the memory unit for improving a testability of the FSM description by reducing an average distance between all pairs of the plurality of states. The testability improving unit comprises: a center state selecting means connected to the memory unit for selecting a center state from candidate states of the plurality of states; transition providing means connected to the memory unit and the center state selecting means for providing, in order to reduce the average distance between all pairs of the plurality of states, the FSM description with new transitions, each of which is directed to the center state from each of the plurality of states other than the center state; and candidate selecting means (111) connected to the memory unit and the center state selecting means for selecting the candidate states among the plurality of states with an asynchronous reset state of the plurality of states excluded from the candidate states.

Alternatively, the candidate selecting means selects the candidate states among the plurality of states with the asynchronous reset state and a near state of the plurality of states excluded from the candidate states. The near state has a distance which is calculated from the asynchronous reset state to the near state and which is shorter than a predetermined threshold value.

As a further alternative, the candidate selecting means selects the candidate states among the plurality of states with the asynchronous reset state and near states of the plurality of states excluded from the candidate states. Each of the near states has a distance which is calculated from the asynchronous reset state to each of the near states and which is shorter than the predetermined threshold value.

Thus, the candidate states exclude the asynchronous reset state and the near state at a short distance from the asynchronous reset state. Those states would provide no or less effect in improving the testability even when selected as the center state. Therefore, even if the total distance to the other states is small from the asynchronous reset state or the near state at a short distance from the asynchronous reset state, such state is not selected as the center state.

DESCRIPTION OF THE PREFERRED EMBODIMENTS

Figure 1:
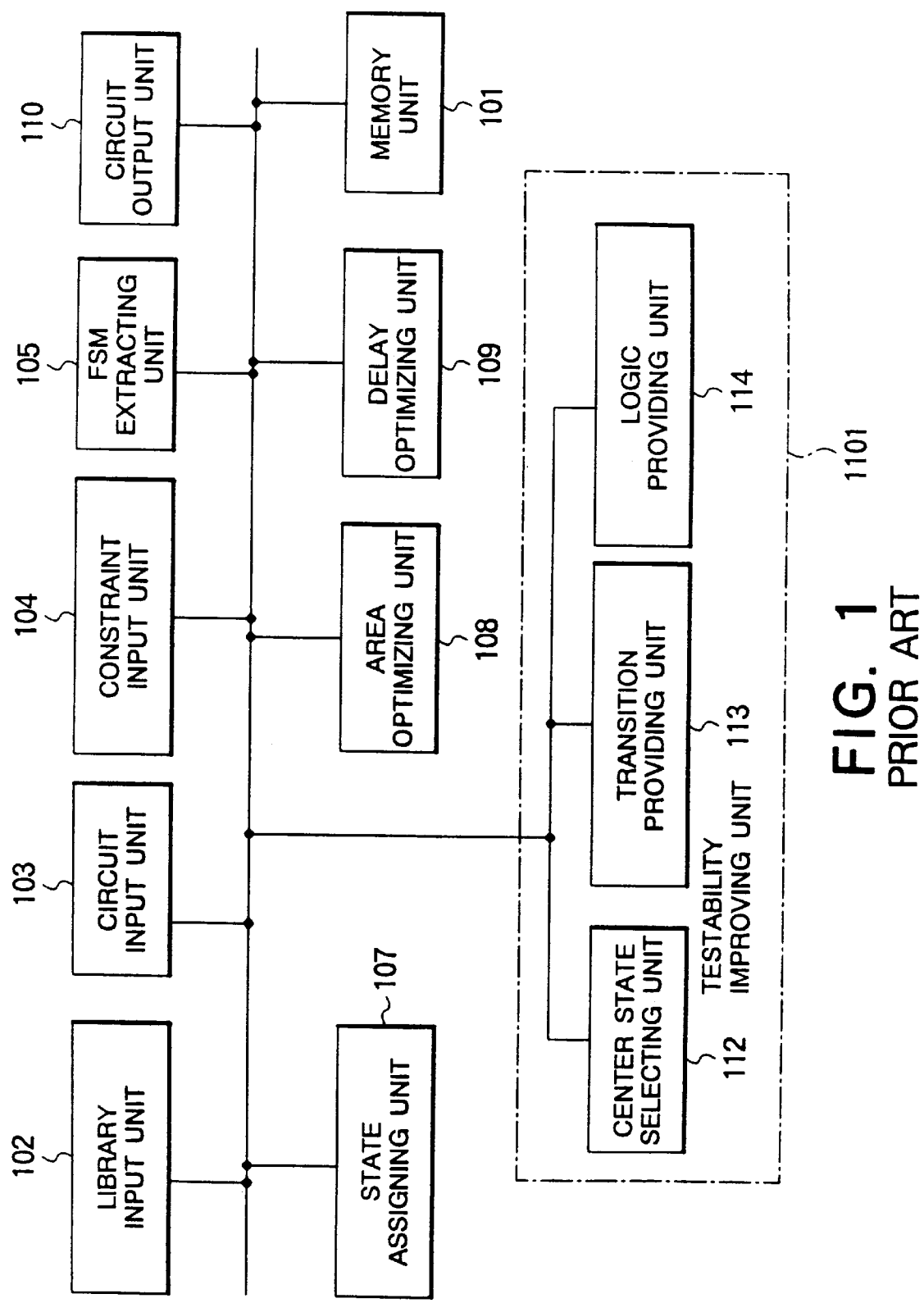
FIG. 1 is a block diagram showing the structure of a conventional logic synthesis-for-testability system.
Figure 2:
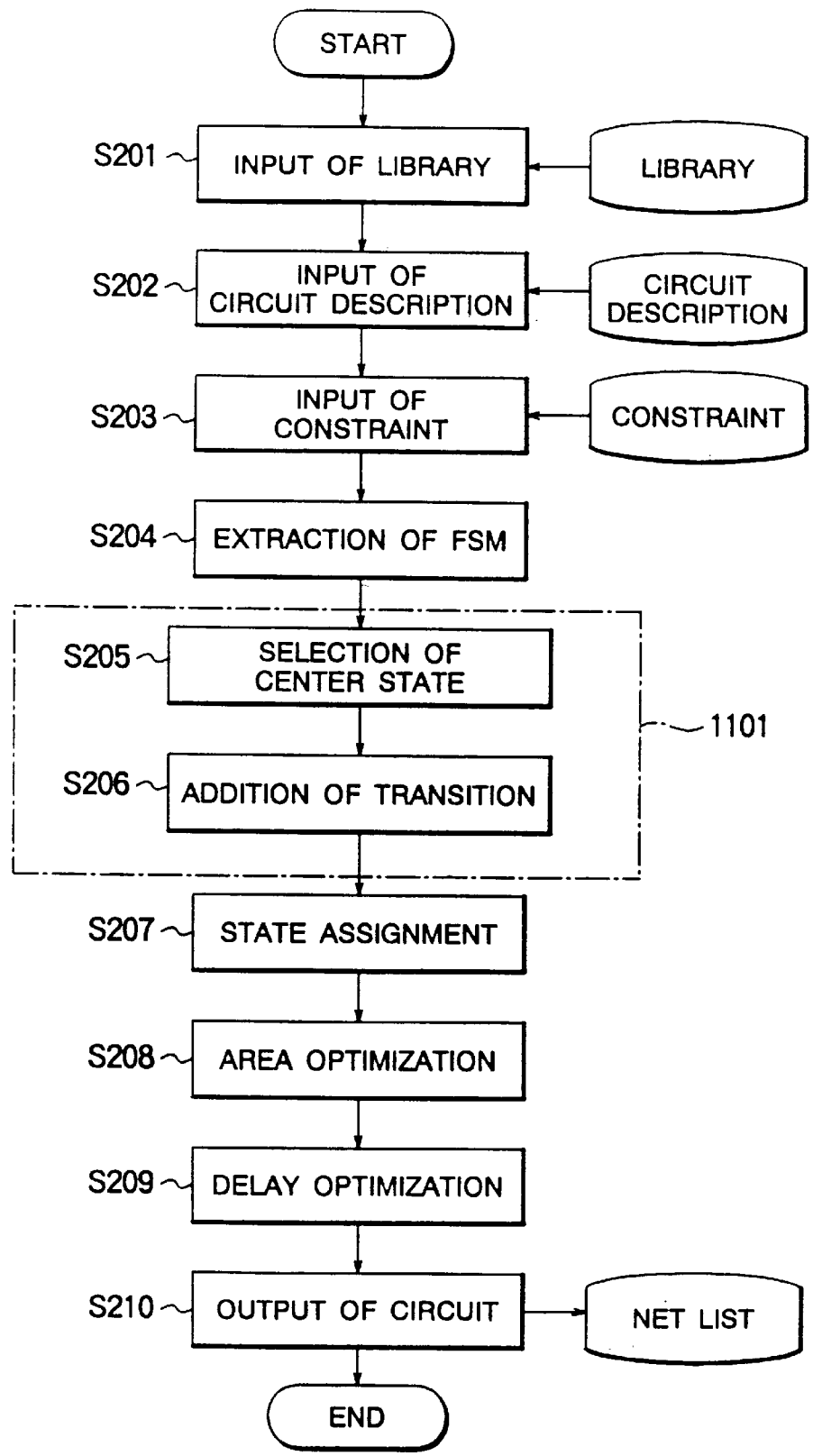
FIG. 2 is a flow chart for describing the operation of the conventional system in FIG. 1.
Figure 3:
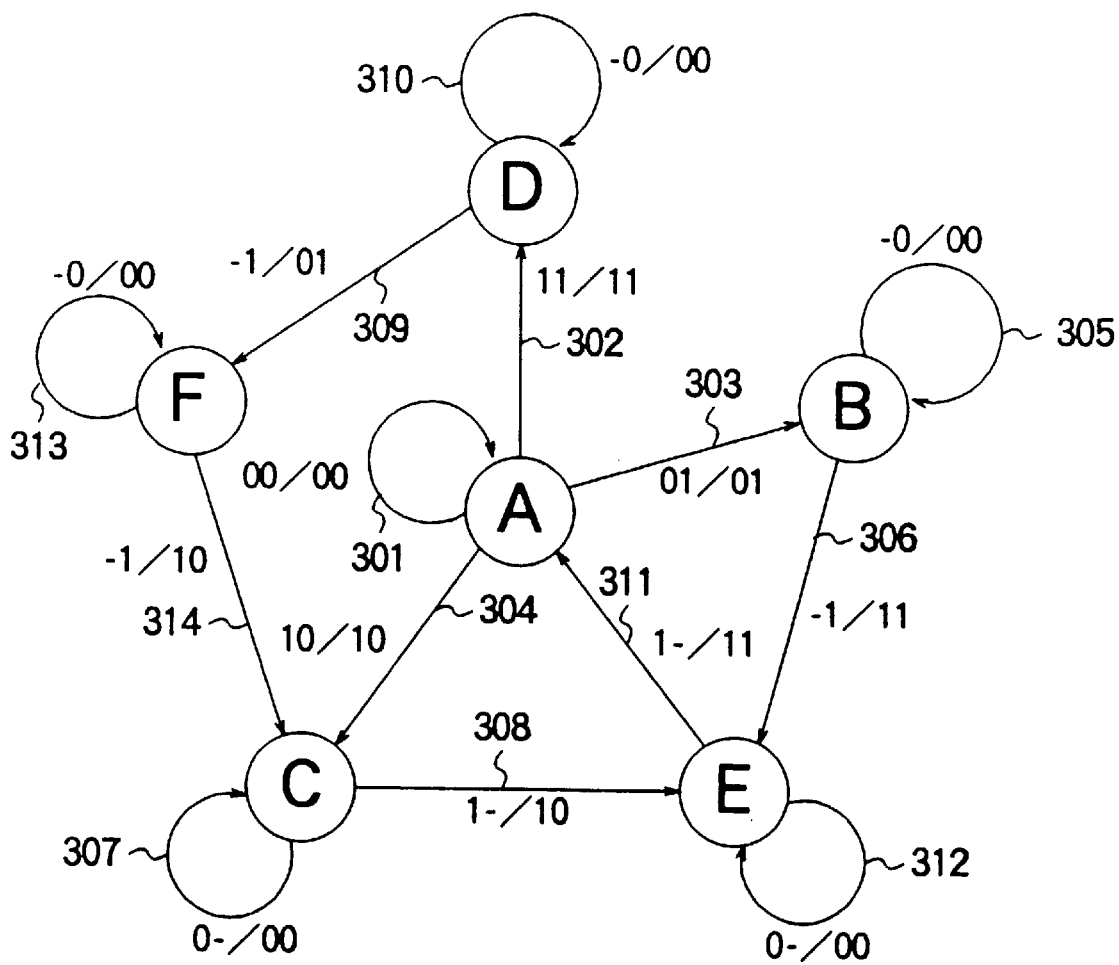
FIG. 3 is a state transition graph of an FSM as an object of logic synthesis by the conventional system in FIG. 1.

Now, description will be made about preferred embodiments of this invention with reference to the drawing.

First Embodiment

Figure 12:
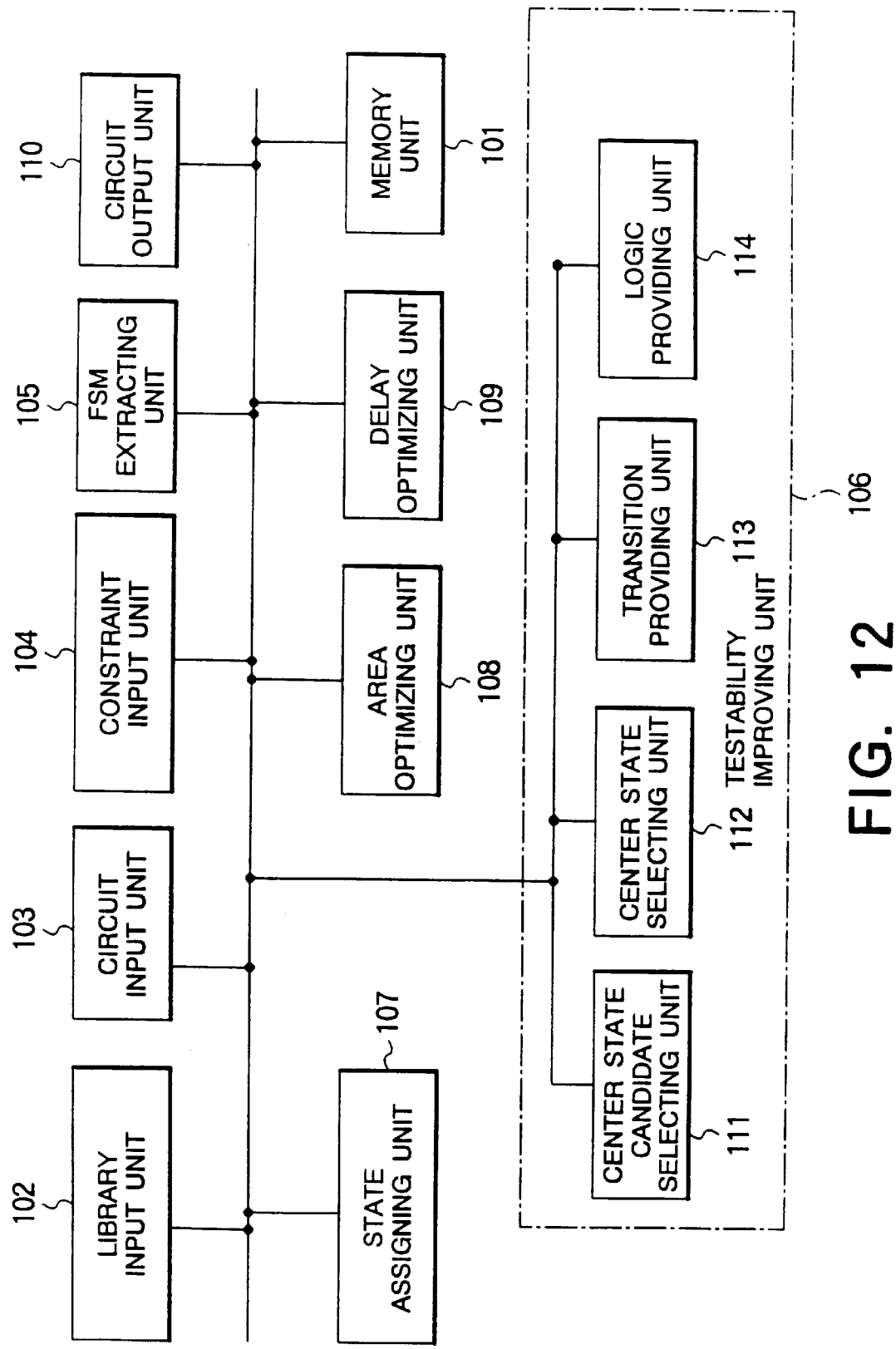
FIG. 12 is a block diagram showing the structure of a logic synthesis-for-testability system according to this invention.

Referring to FIG. 12, a logic synthesis-for-testability system according to a first embodiment of this invention comprises a memory unit 101 for holding in the form of circuit description an objective circuit to be logically synthesized, a technology library used in technology mapping, and a constraint such as an area and a delay of the objective circuit, a library input unit 102 for reading the technology library to make the memory unit 101 hold the technology library, a circuit input unit 103 for reading the circuit description of the objective circuit to make the memory unit 101 hold the objective circuit, a constraint input unit 104 for reading the constraint to make the memory unit 101 hold the constraint, an FSM extracting unit 105 for extracting an FSM in case where the objective circuit held in the memory unit 101 is represented in any format other than the FSM, a testability improving unit 1101 for improving a testability of the objective circuit held in the memory unit 101 and represented by the FSM, a state assigning unit 107 for assigning a binary-logic vector to the state of the objective circuit held in the memory unit 101 and represented by the FSM, an area optimizing unit 108 for optimizing the area of the objective circuit held in the memory unit 101, a delay optimizing unit 109 for optimizing the delay of the objective circuit held in the memory unit 101, and a circuit output unit 110 for producing a resultant circuit obtained as a result of the logic synthesis and held In the memory unit 110.

The testability improving unit 106 comprises a center state candidate selecting unit 111 for excluding from candidates for a center state an asynchronous reset state and a state at a short distance from the asynchronous reset state, i.e., for selecting those states at long distances from the asynchronous reset state as the candidates for the center state, a center state selecting unit 112 for selecting the center state from the candidate states, a transition providing unit 113 for providing the FSM with transitions to the center state, and a logic providing unit 114 for providing the circuit after state assignment with a logic circuit for producing a binary-logic vector assigned to the center state.

Figure 13:
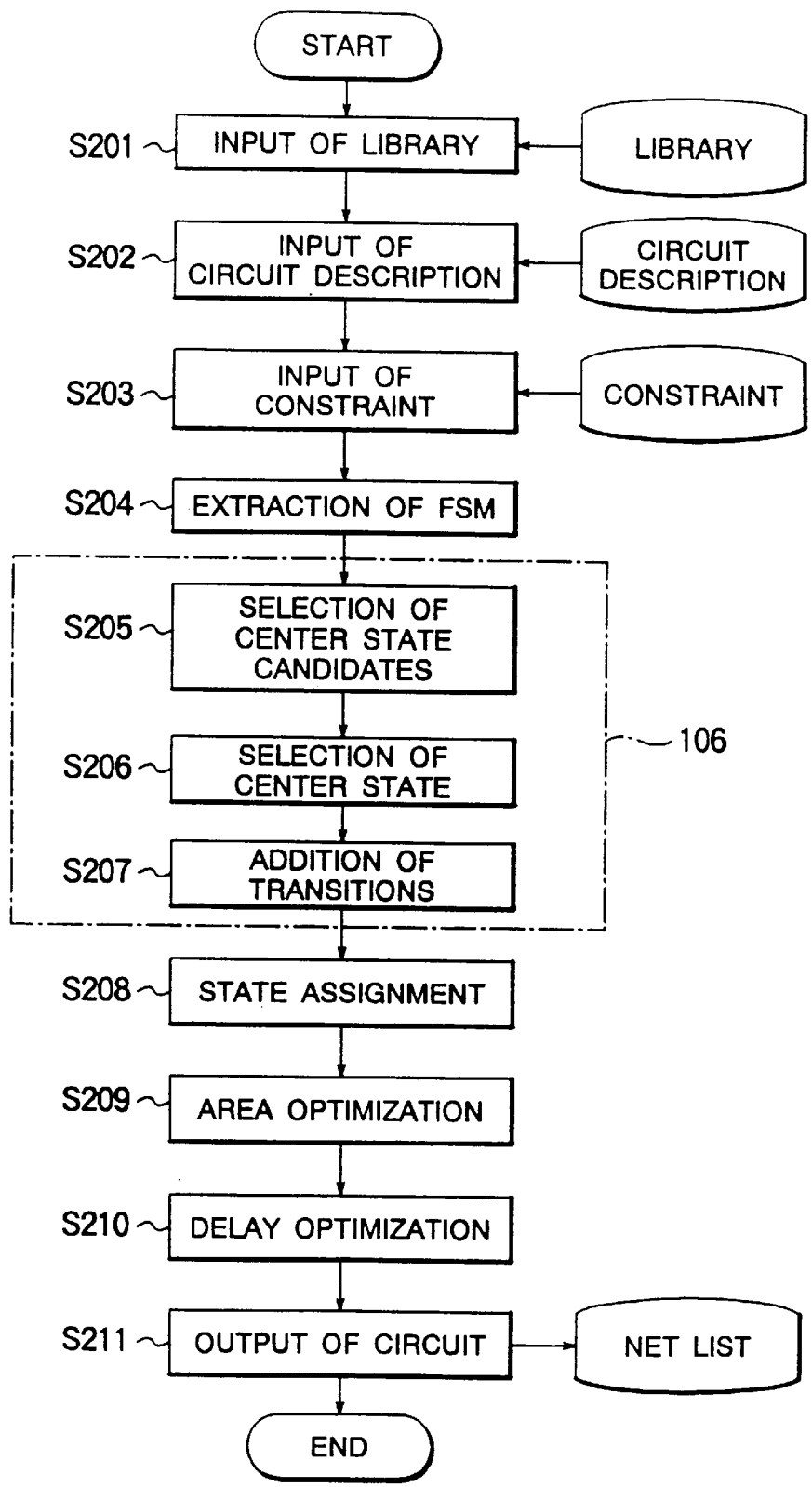
FIG. 13 is a flow chart for describing the operation of the system in FIG. 12.

Referring to FIG. 13 in addition to FIG. 12, the operation of the logic synthesis-for-testability system according to the first embodiment will be described.

In a step S201, the library input unit 102 reads the technology library to make the memory unit 101 hold the technology library. In a step S202, the circuit input unit 103 reads the circuit description to make the memory unit 101 hold the circuit description. In a step S203, the constraint input unit 104 reads the constraint to make the memory unit 101 hold the constraint. In a step S204, the FSM extracting unit 105 extracts the FSM in case where the objective circuit held in the memory unit 101 is represented in any format other than the FSM and makes the memory unit 101 holds the FSM.

In a step S205, the center state candidate selecting unit 111 excludes from the candidates for the center state the asynchronous reset state and the state at a short distance from the asynchronous reset state.

In a step S206, the center state selecting unit 112 selects the center state. In a step S207, the transition providing unit 113 provides the transition from each state to the center state. In a step S208, the state assigning unit 107 assigns the binary-logic vector to the state of the FSM held in the memory unit 101. In a step S209, the area optimizing unit 108 executes, upon the circuit held in the memory unit 101, technology-independent area optimization such as two-level or multi-level logic optimization as well as technology-dependent area optimization or technology mapping utilizing the technology library. In a step S210, the delay optimizing unit 109 executes, upon the circuit held in the memory unit 101, technology-independent delay optimization as well as technology-dependent delay optimization or technology mapping utilizing the technology library so as to satisfy the constraint. In a step S211, the circuit output unit 110 produces a net list of a resultant circuit obtained as a result of the logic synthesis and held in the memory unit 110.

The effect of the first embodiment will be described. According to the first embodiment, the asynchronous reset state itself and the state at a short distance from the asynchronous reset state are excluded from the candidates for the center state without taking all the states as the candidates. Thus, the state at a long distance from the asynchronous reset state and effective in reduction of the distances is selected as the center state. If this invention is applied to the FSM having the asynchronous reset state, the state much effective in reduction of the distances can be advantageously selected as the center state as compared with the case where the asynchronous reset state is not taken into consideration.

Second Embodiment

A logic synthesis-for-testability system according to a second embodiment of this invention is similar to the first embodiment except that the center state candidate selecting unit 111 judges whether the distance from the asynchronous reset state is short or long, utilizing the fact that the maximum possible distance is dependent upon the number of states. Specifically, in the second embodiment, the center state candidate selecting unit 111 adopts, as a measure or such judgement, a threshold value obtained by calculation of an equation using the number of states. The testability is provided by the logic providing unit 114.

Herein, the center state candidate selecting unit 111 uses as the threshold value a numerical value obtained by dividing the square root of the number of the states by two. At the time instant when a combinational circuit portion of a sequential circuit generated by the state assigning unit 107 is expressed by a two-level logic, the logic providing unit 114 provides the two-level logic with a logic or cube for producing an internal state binary-logic vector assigned to the center state.

A first effect of the second embodiment is that, since the calculation result of the equation using the number of states is adopted as the threshold value in judgement between a short distance and a long distance from the asynchronous state, calculation of the distances for all pair of state is no longer necessary.

A second effect will be described. In the second embodiment, the logic cube equivalent to the transitions to the center state is added to the two-level logic expressing the combinational circuit after application of the state assigning unit 107. This achieves the testability equivalent to that obtained by addition of the transitions by the transition providing unit 210 or by addition of the logic element by the logic providing unit 2101.

Next, the operation of the system according to the second embodiment will be described.

Figure 14:
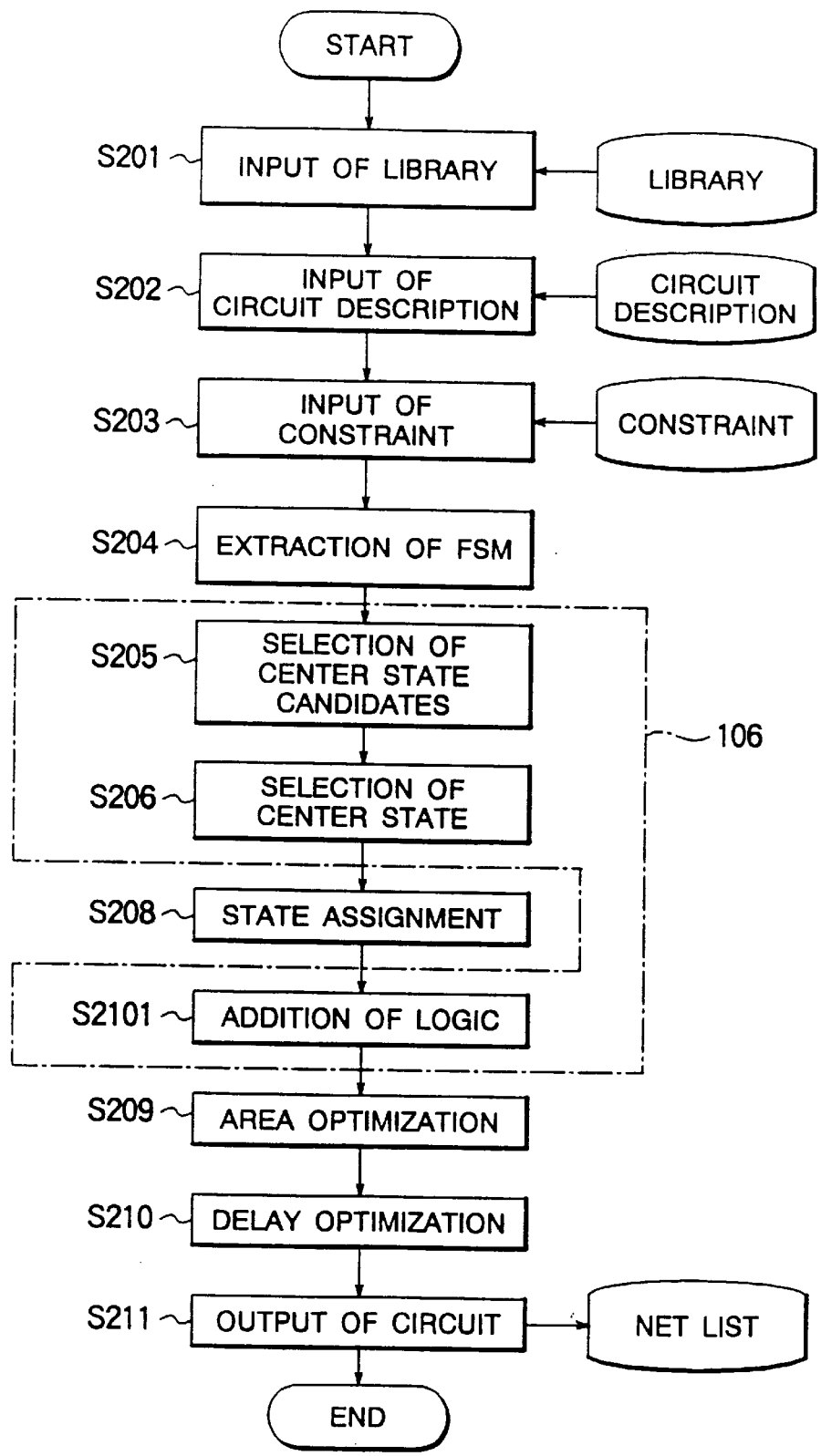
FIG. 14 is a flow chart for describing the operation of a logic synthesis-for-testability system according to a second embodiment of this invention.

Referring to FIG. 14, the operation of the second embodiment is similar to the first embodiment except the following. Specifically, after application of the center state selecting unit 112 in the step S206, the state assigning unit 107 is applied in the step S208. Thereafter, in a step S2101, the logic providing unit 114 is applied without using the transition providing unit 113.

Now, the operation of the testability improving unit 106 of the second embodiment of this invention will be described in detail.

Figure 11:
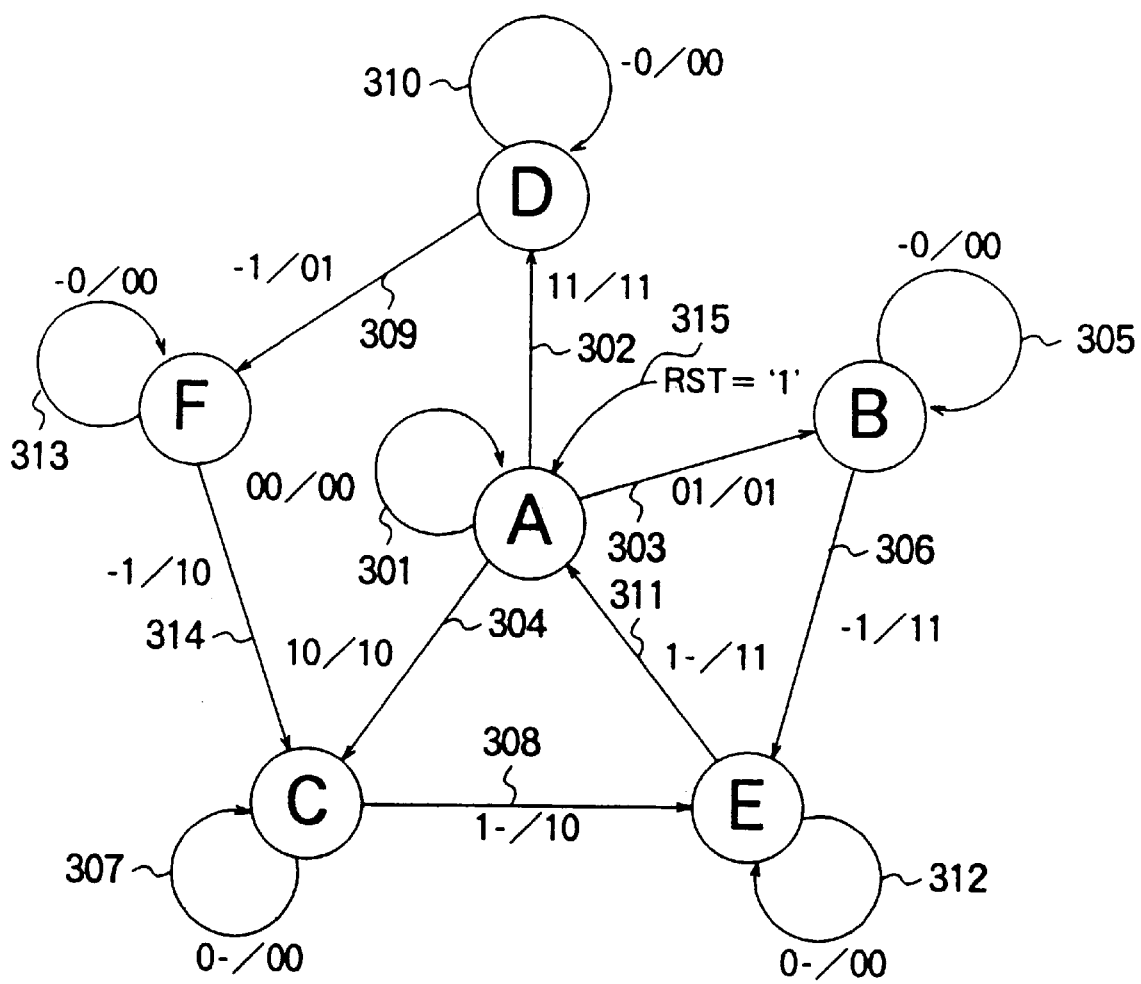
FIG. 11 is a state transition graph of an FSM as an object of logic synthesis, with an asynchronous reset state contained therein.

It is assumed that the FSM in FIG. 11 is an object of logical synthesis.

In the step S205, the center state candidate selecting unit 111 selects the candidates for the center state.

Figure 15:
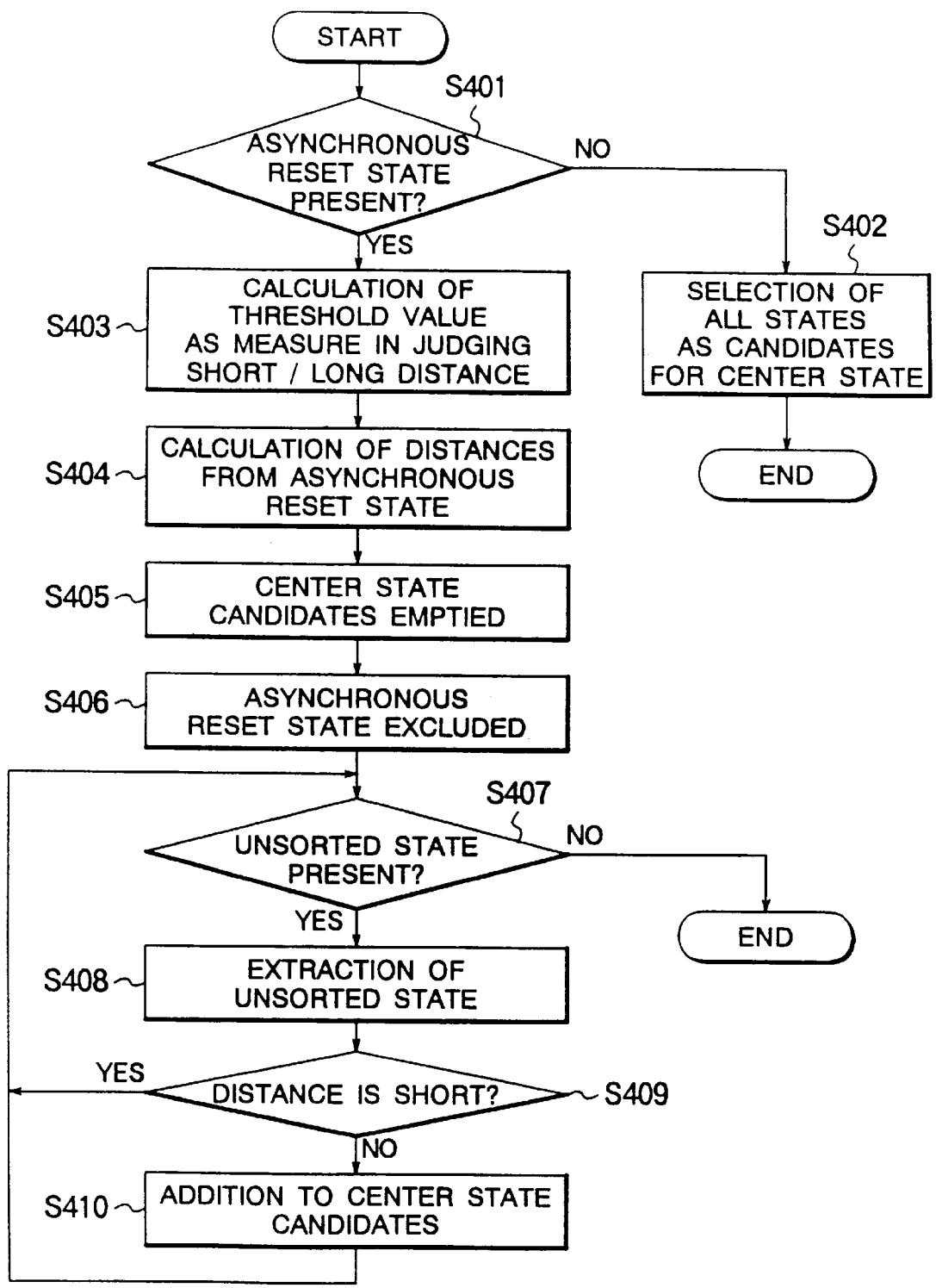
FIG. 15 is a flow chart for describing the operation of a center state candidate selecting unit in FIG. 12.

Referring to FIG. 15, the operation of the center state candidate selecting unit 111 will be described in detail.

If no asynchronous reset state is detected in a step S401, the operation proceeds to a step S402. In the step S402. all the states are selected as candidates for the center state and the operation of the center state candidate selecting unit 111 is completed. In presence of the asynchronous reset state, the operation proceeds to a step S403.

In the step S403, calculation is made of the threshold value as a measure of judgement between a short distance and a long distance from the asynchronous reset state. The threshold value is a numerical value obtained by dividing the square root of the number of states by two. Since the number of states is equal to six, the threshold value is equal to 1.22.

In a step S404, calculation is made of the distances from the asynchronous reset state. The result of calculation is shown in Table 7.

TABLE 7

|   | A | B | C | D | E | F |
|---|---|---|---|---|---|---|
| A | 1 | 1 | 1 | 1 | 2 | 2 |

In a step S405, the candidates for the center state are emptied.

In a step S406, the asynchronous reset state is sorted and excluded from the candidates for the center state. At this point, the state A is no longer selected as the center state.

In a step S407, judgement is made about presence or absence of any unsorted state not yet subjected to selection of the candidate for the center state. If all the states have been sorted, the operation of the center state candidate selecting unit 111 is finished. If any unsorted state is left, the operation proceeds to a step S408.

In the step S408, one unsorted state is extracted to be sorted. At first, it is assumed that the state B is extracted.

In a step S409, comparison is made between the threshold value calculated in the step S403 and the distance from the asynchronous reset state calculated in the step S404 to the state extracted in the step S408. If the distance is short and long, the operation proceeds to the step S407 and the step S410, respectively. Herein, the distance from the asynchronous reset state A to the state B is equal to one. As a result of comparison with the threshold value of 1.22, it is judged that the distance from the asynchronous reset state is short. Therefore, the operation proceeds to the step S407.

In the step S410, the state extracted in the step S407 is added to the candidates for the center state. Then, the operation proceeds to the step S407.

Next, it is assumed that the state E is extracted in the step S408.

In the step S409, comparison is made between the distance equal to 2 from the asynchronous reset state to the state E and the threshold value of 1.22. In this event, it is judged that the distance from the asynchronous reset state is long. The operation proceeds to the step S410 in which the state E is added to the candidates for the center state. The operation proceeds to the step S407.

As a result of completion of the operation of the center state candidate selecting unit 111, the distance from the asynchronous reset state is greater than the threshold value of 1.22 at the states E and F. These two states are taken as the candidates for the center state.

Next, the center state selecting unit 112 selects the center state among the candidates selected by the center state candidate selecting unit 111.

Figure 4:
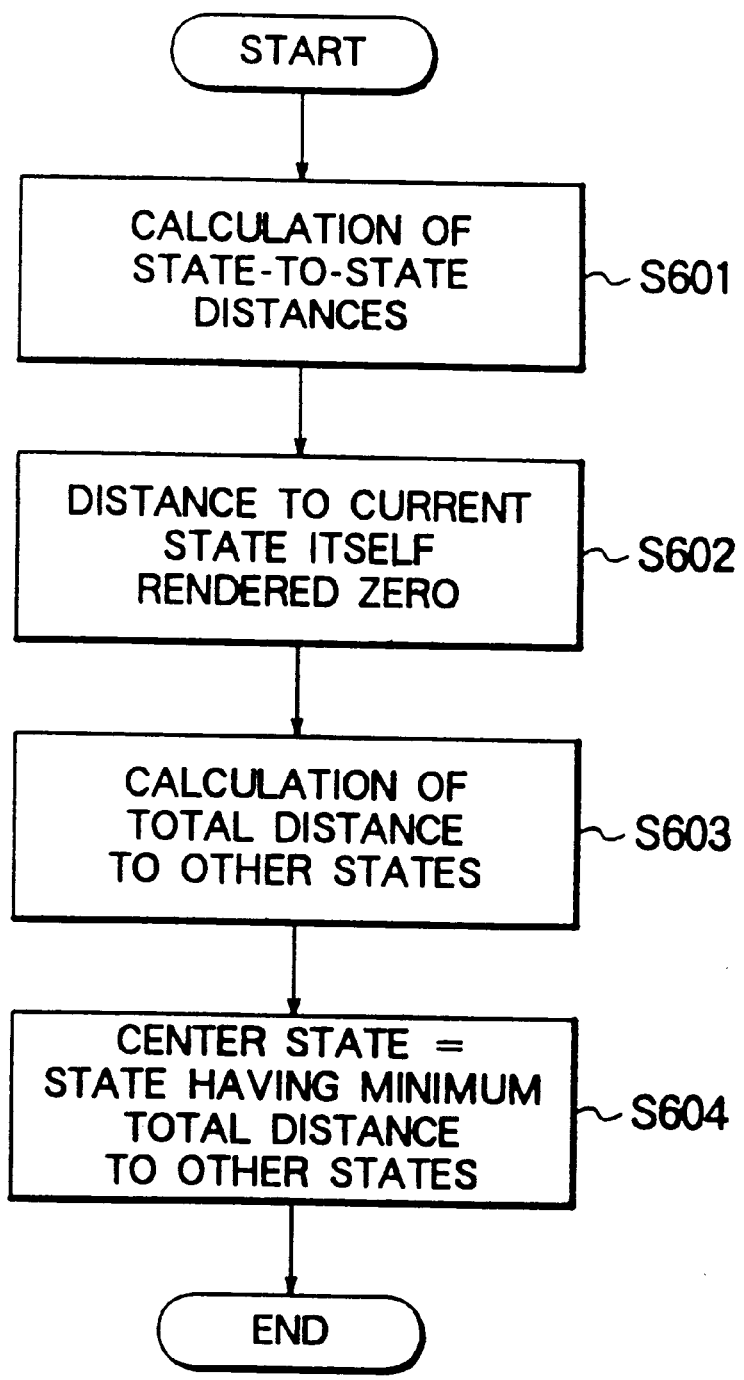
FIG. 4 is a flow chart for describing the operation of a center state selecting unit in each of the conventional system and a system according to this invention.
Figure 5:
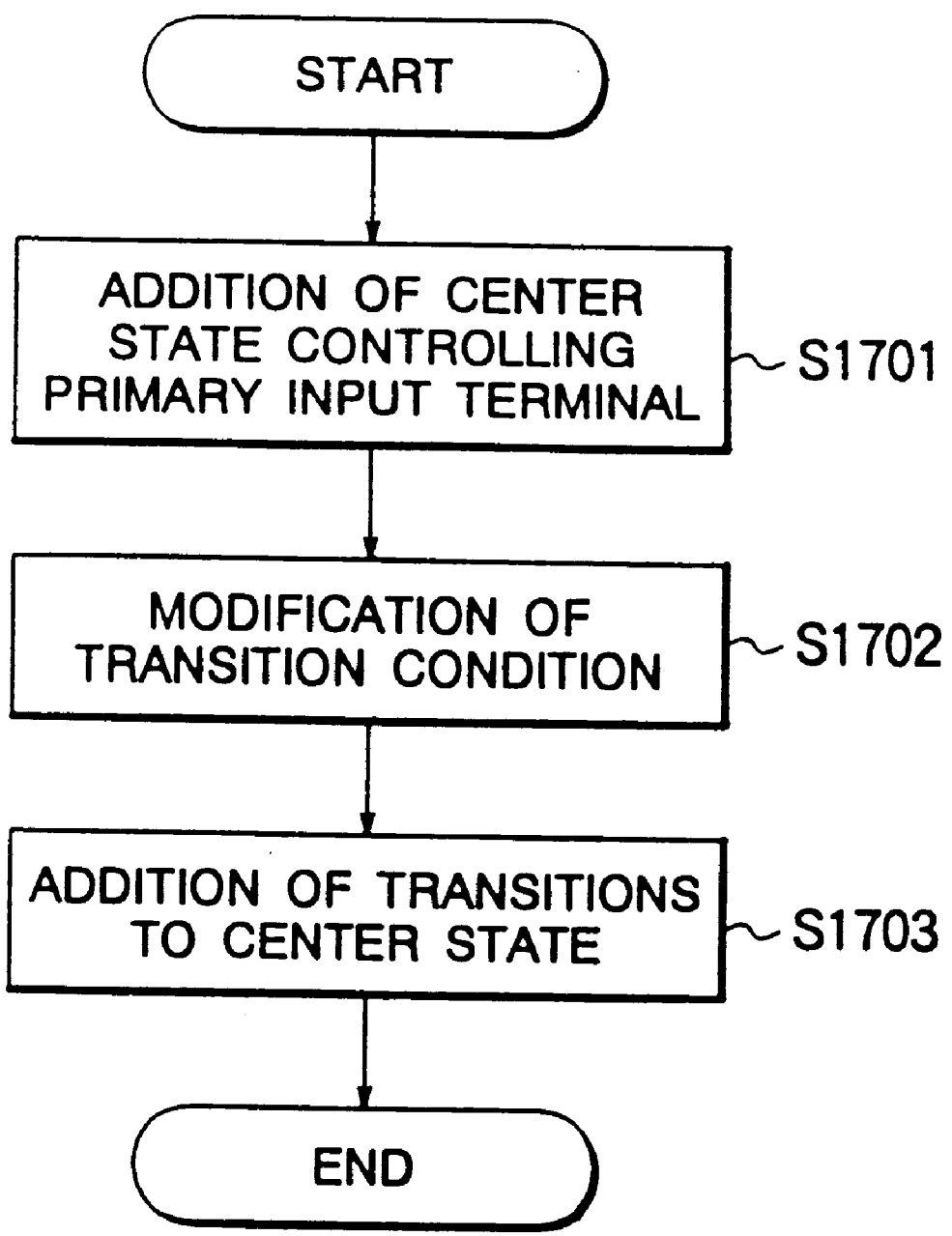
FIG. 5 is a flow chart for describing the operation of a transition providing unit in FIG. 1.
Figure 6:
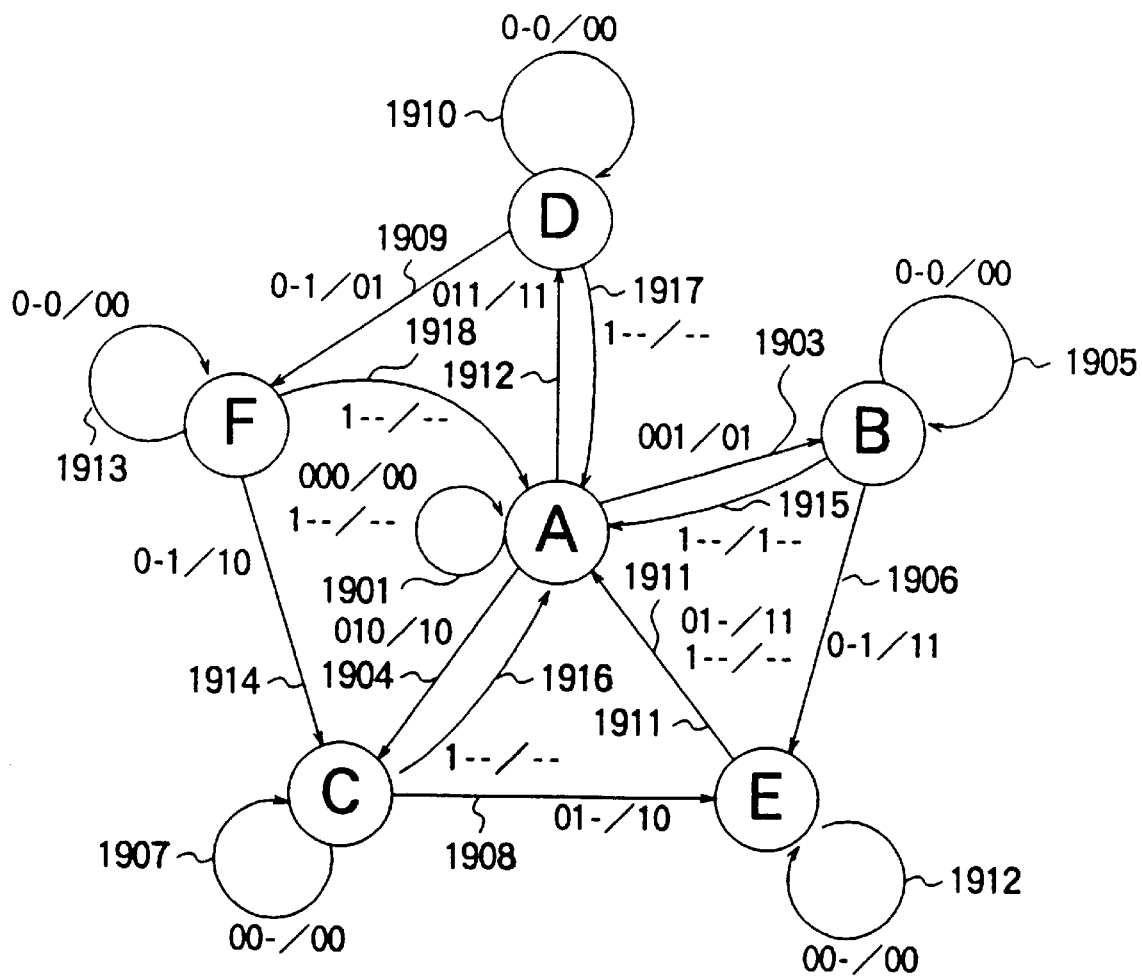
FIG. 6 is a state transition graph of the FSM after the operation of the transition providing unit.
Figure 7:
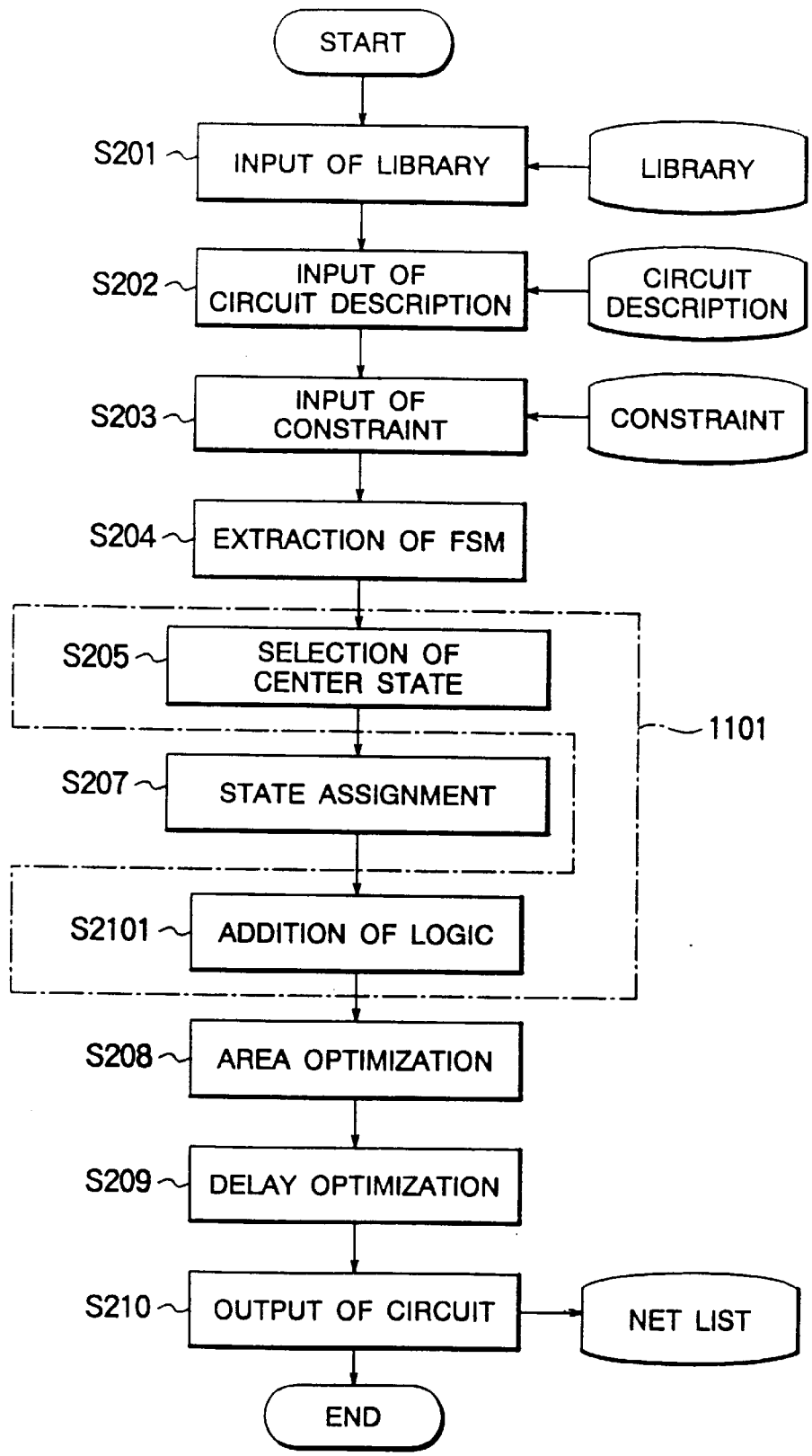
FIG. 7 is a flow chart for describing the operation of the conventional system using a logic providing unit.
Figure 8:
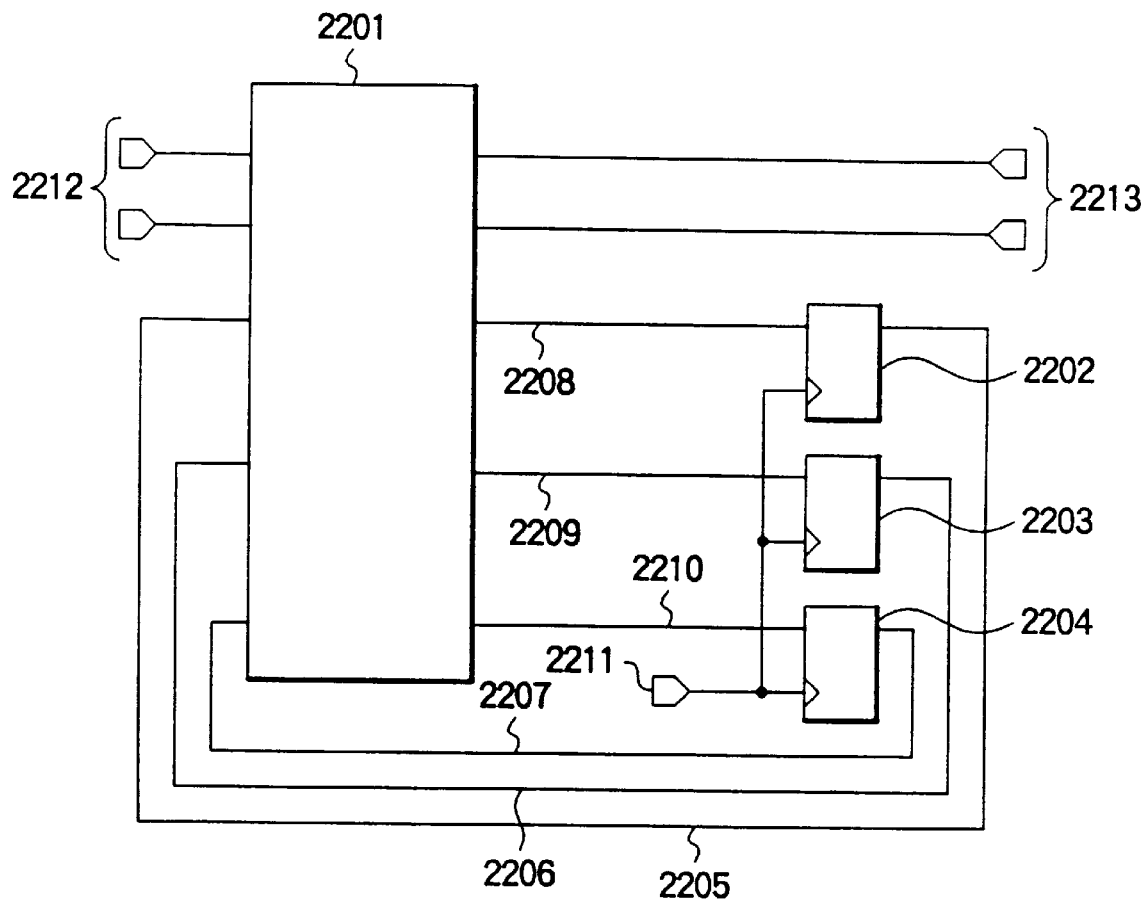
FIG. 8 is a view showing a sequential circuit as a result of operation of a state assigning unit.
Figure 9:
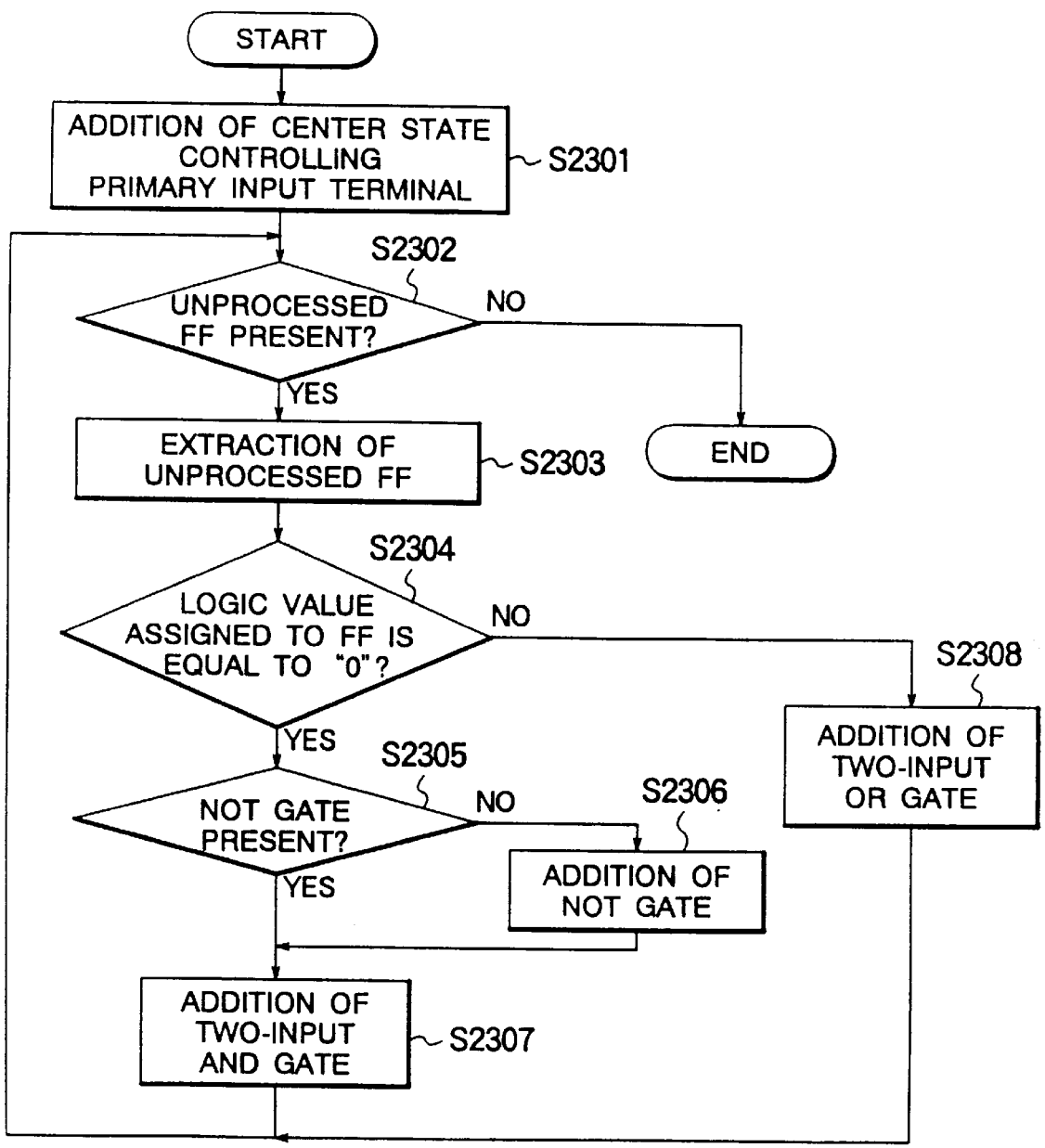
FIG. 9 is a flow chart for describing the operation of the logic providing unit.
Figure 10:
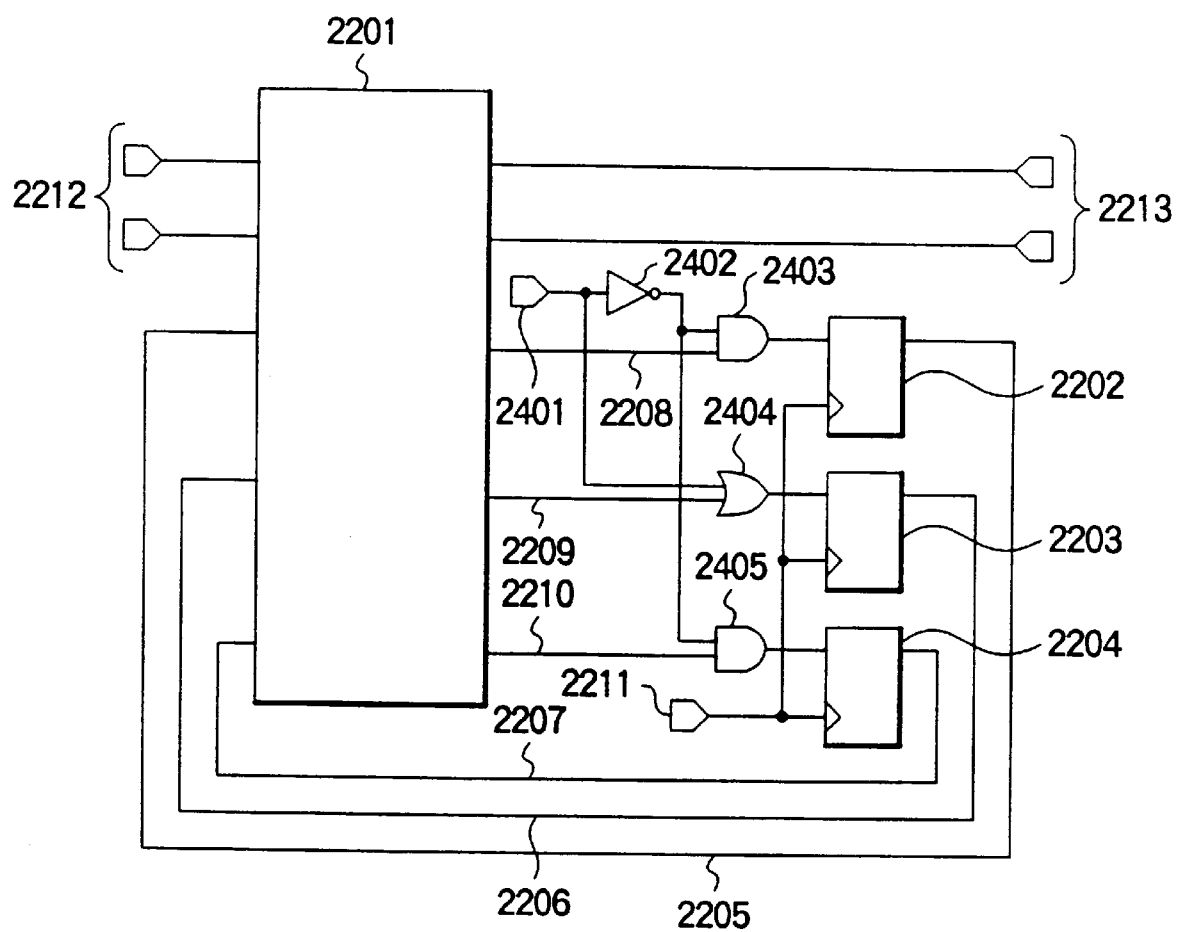
FIG. 10 is a view showing a sequential circuit as a result of application of the logic providing unit to the sequential circuit in FIG. 8.

Referring to FIG. 4, description will be made in detail as regards the operation of the center state selecting unit 112.

In a step S601, calculation is made of the distances between the center state candidate states. Upon calculation, those states other than the center state candidates can be used to obtain shortest paths. The result is shown in Table 8.

TABLE 8

|   | E | F |
|---|---|---|
| E | 1 | 3 |
| F | 2 | 1 |

In a step S602, the distance from a particular state to the particular state itself is considered to be 0. The result is shown in Table 9.

TABLE 9

|   | E | F | SUM |
|---|---|---|-----|
| E | 0 | 3 | 3 |
| F | 2 | 0 | 2 |

Unlike Table 8, the crosspoints (E, E) and (F, F) are equal to 0.

In a step S603, calculation is made of a total distance for each of the candidate states for the center state. The result is shown in the column labelled "SUM" in Table 9.

In a step S604, the state having a minimum total distance is selected as the center state. From Table 9, the total distance from the state E is equal to 3 while the total distance from the state F is equal to 2. Therefore, the state F having the minimum total distance is selected as the center state.

Next, in a step S208, the state assigning unit 107 assigns the internal state binary-logic vector to each state in the FSM.

As described in conjunction with the conventional system, the state assigning unit 107 expresses the FSM by the FFs for representing the states by the internal state binary-logic vector assigned thereto, and the combinational circuit responsive to the primary input terminal logic values and the FF output logic values for producing the primary output terminal logic values and the FF data input logic values. One mode of expression of the combinational circuit is a multi-input/multi-output two-level logic. To the two-level logic, a cube is added which is for producing the internal state binary-logic vector assigned to the center state.

Table 10 shows the internal state binary-logic vector assigned to each state as a result of application of the state assigning unit 107 to the FSM in FIG. 11(the second embodiment). FFs 2509 through 2511 are produced and the state A is assigned with the internal state "000" (2501). Binary-logic vectors "101" (2507) and "111" (2508) are not used in assignment.

TABLE 10

| State | FF2509 | FF2510 | FF2511 | |
|---|---|---|---|---|
| A | 0 | 0 | 0 | 2501 |
| B | 0 | 1 | 0 | 2502 |
| C | 0 | 1 | 1 | 2503 |
| D | 1 | 0 | 0 | 2504 |
| E | 0 | 0 | 1 | 2505 |
| F | 1 | 1 | 0 | 2506 |
| Unused | 1 | 0 | 1 | 2507 |
| Unused | 1 | 1 | 1 | 2508 |

Table 11 shows the two-level logic representative of the combinational circuit portion obtained as a result of application of the state assigning unit 107 to the FSM in FIG. 11 (the second embodiment). Left and right sides partitioned by colons (:) represent input logic values and output logic values, respectively. The input logic values comprise the primary input terminal logic values and the FF output logic values while the output logic values comprise the FF data input logic values and the primary output logic values. Both the FF output logic values and the FF data input logic values are described in the order of the FFs 2509, 2510, and 2511.

TABLE 11

| Primary Input | FF Output Logic Value | | FF Data Input Logic Value | Primary Output | |
|---|---|---|---|---|---|
| 00 | 000 | : | 000 | 00 | 2601 |
| 01 | 000 | : | 010 | 01 | 2602 |
| 10 | 000 | : | 011 | 10 | 2603 |
| 11 | 000 | : | 100 | 11 | 2604 |
| −0 | 010 | : | 010 | 00 | 2605 |
| −1 | 010 | : | 001 | 11 | 2606 |
| 0− | 011 | : | 011 | 00 | 2607 |
| 1− | 011 | : | 001 | 10 | 2608 |
| −0 | 100 | : | 100 | 00 | 2609 |
| −1 | 100 | : | 110 | 01 | 2610 |
| 0− | 001 | : | 001 | 00 | 2611 |
| 1− | 001 | : | 000 | 11 | 2612 |
| −0 | 110 | : | 110 | 00 | 2613 |
| −1 | 110 | : | 011 | 10 | 2614 |
| — | 101 | : | — | — | 2615 |
| — | 111 | : | — | — | 2616 |

For example, when the primary input terminal logic values are equal to "01" and the internal state of the FFs is "000", the cube 2602 brings the internal state of the FFs and the primary output terminal logic values into "010" and "01", respectively. The cube 2602 is equivalent to the transition 303. The cube 2615 uses the unused binary-logic vector "101" (2507) as "don't care".

Figure 16:
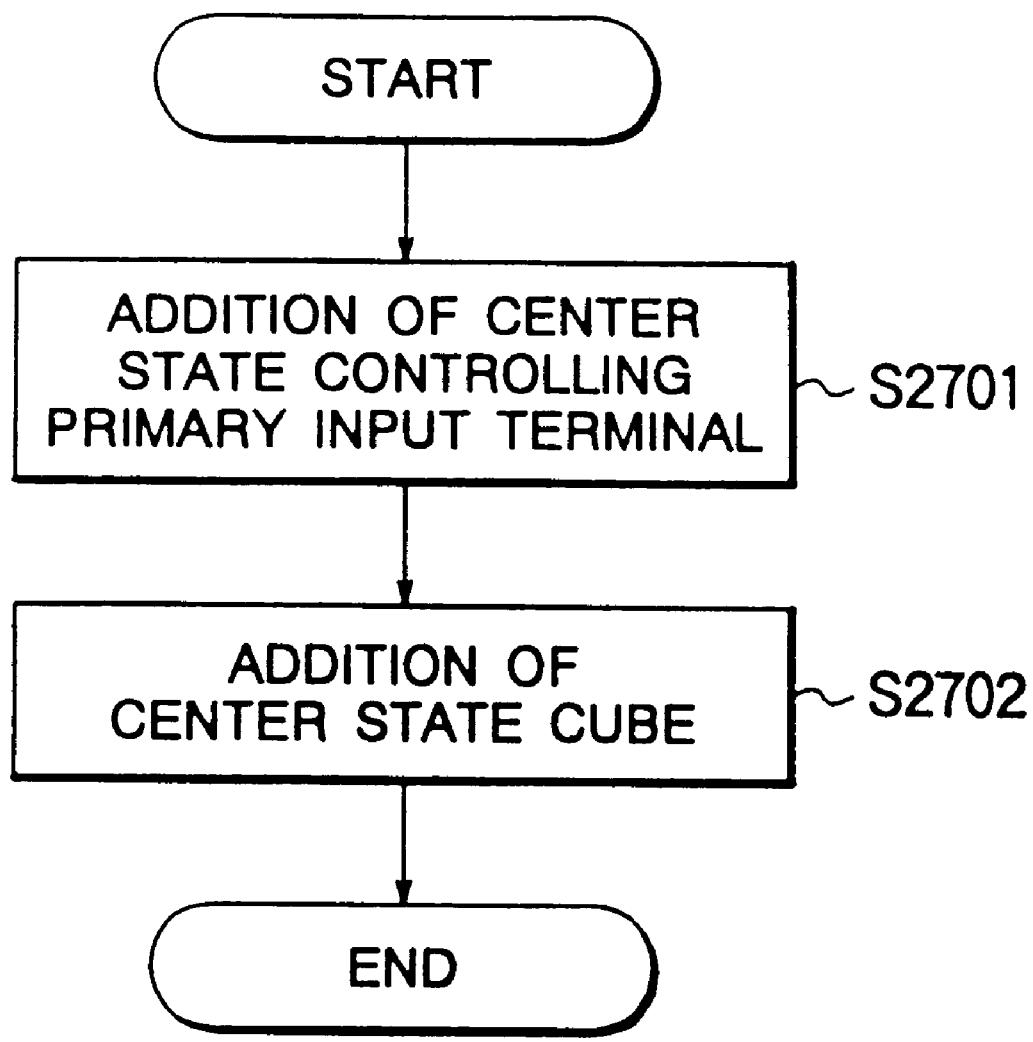
FIG. 16 is a flow chart for describing the operation of the logic providing unit for providing a logic cube producing as an internal state binary-logic vector assigned to a center state.

Referring to FIG. 16, the operation of the logic providing unit 114 will be described. The logic providing unit 114 is for providing the cube producing the internal state binary-logic vector assigned to the center state.

Table 12 shows the result of application of the logic providing unit 114 to the two-level logic in Table 11.

TABLE 12

| Center State Controlling Primary Output | Primary Input | FF Output Logic | | FF Data Input Logic | Primary Output | |
|---|---|---|---|---|---|---|
| 0 | 00 | 000 | : | 000 | 00 | 2801 |
| 0 | 01 | 000 | : | 010 | 01 | 2802 |
| 0 | 10 | 000 | : | 011 | 10 | 2803 |
| 0 | 11 | 000 | : | 100 | 11 | 2804 |
| 0 | −0 | 010 | : | 010 | 00 | 2805 |
| 0 | −1 | 010 | : | 001 | 11 | 2806 |
| 0 | 0− | 011 | : | 011 | 00 | 2807 |
| 0 | 1− | 011 | : | 001 | 10 | 2808 |
| 0 | −0 | 100 | : | 100 | 00 | 2809 |
| 0 | −1 | 100 | : | 110 | 01 | 2810 |
| 0 | 0− | 001 | : | 001 | 00 | 2811 |
| 0 | 1− | 001 | : | 000 | 11 | 2812 |
| 0 | −0 | 110 | : | 110 | 00 | 2813 |
| 0 | −1 | 110 | : | 011 | 10 | 2814 |
| 0 | — | 101 | : | — | — | 2815 |
| 0 | — | 111 | : | — | — | 2816 |
| 1 | — | — | : | 110 | — | 2817 |

In step S2701, the logic value of the center state controlling primary input terminal is added to each cube. When the center state controlling primary input terminal has the logic "0" value, the original operation is executed. When the center state controlling primary input terminal has the logic "1" value, the internal state binary-logic vector assigned to the center state is produced. For example, the cube 2601 is modified into the cube 2801 by addition of the condition that the center state controlling primary input terminal has the logic "0". Similar description also applies to the others.

In a step S2702, the cube is added which produces the binary-logic vector assigned to the center state. The cube 2817 is the cube thus added. When the center state controlling primary input terminal has the logic "1" value, the cube 2817 produces the FF data input logic values "110" i.e., the binary-logic vector 2506 assigned to the state F selected as the center state, irrespective of the other primary input terminal logic values and the FF output logic values. The primary output terminal logic values are rendered "don't care".

Accordingly, by the cubes 2801 through 2816, the resultant circuit executes the operation similar to that of the original circuit when the center state controlling primary input terminal has the logic "0" value. On the other hand, by the cube 2817, the resultant circuit makes the FFs 2509 through 2511 have values corresponding to the internal state binary-logic vector "110" assigned to the state F selected as the center state when the center state controlling primary input terminal has the logic "1" value. Therefore, the effect similar to that obtained by the logic providing unit 114 for providing the logic element is achieved.

Specific Example of the First Embodiment

Next, a specific example of the first embodiment will be described. In this example, description will be made in detail as regards the testability improving unit 106.

FIG. 11 shows the state transition graph of the FSM held in the memory unit 101 as an object of logic synthesis. The FSM comprises the two primary input terminals, the two primary output terminals, and the six states including the asynchronous reset state. The asynchronous reset state is the state A.

Referring to Figs. 11 and 15, the operation of the center state candidate selecting unit 111 will be described.

When any asynchronous reset state is not detected in the step S401, the operation proceeds to the step S402 to select all the states as the candidates for the center state. Then, the operation of the center state candidate selecting unit 111 is terminated. In presence of the asynchronous reset state, the operation proceeds to the step S403. Since the asynchronous reset state is present in this example, the operation proceeds to the step S403.

In the step S403, calculation is made of the threshold value as a measure of judgement between a short distance and a long distance from the asynchronous reset state. As such measure of judgement of a short distance or a long distance, the following can be used.

(1) The average distance is used as the threshold value. If the distance from the asynchronous reset state is smaller than the average distance, the state is excluded from the candidates for the center state. Thus, those states at long distances from the asynchronous reset state are selected as the candidates.

(2) From the fact that the maximum possible distance is dependent upon the number of the states, the equation using the number of the states, for example, the square root of the number of the states is calculated to obtain a calculation result as the threshold value. If the distance from the asynchronous reset state is smaller than the calculation result, the state is excluded from the candidates for the center state. Thus, those states at long distances from the asynchronous reset state are selected as the candidates.

(3) The number of the states to be selected as the candidates is specified. The candidates are selected up to the specified number in the order from the state having a longer distance from the asynchronous reset state.

Herein, the average distance (1) is used as the measure.

In the step S403, calculation is made of the threshold value as the measure of judgement between a short distance and a long distance. In order to calculate the average distance, the distances are calculated for all pairs of the states. The result in shown in Table 6 given above. The average distance is equal to 1.61.

In the step S404, calculation is made of the distances from the asynchronous reset state to the other states. Since the distances from the asynchronous reset state are already calculated when the threshold value is calculated in the step S403, the distances are used in common. Specifically, the distances from the asynchronous reset state are shown in row A in Table 6.

In the step S405, the candidates for the center state are emptied.

In the step S406, the asynchronous reset state is sorted and excluded from the candidates for the center state. At this point, the state A is no longer selected as the center state.

In the step S407, judgement is made about presence or absence of any unsorted state not yet subjected to selection of the candidates for the center state. If all the states have been sorted, the operation of the center state candidate selecting unit 111 is terminated. If any unsorted state is left, the operation proceeds to the step S408.

In the step S408, one unsorted state is extracted to be sorted. At first, it is assumed that the state B is extracted.

In the step S409, comparison is made between the distance from the asynchronous reset state calculated in the step S404 to the state extracted in the step S408 and the threshold value calculated In the step S403. If the distance is short and long, the operation proceeds to the step S407 and the step S410, respectively. Herein, the distance from the asynchronous reset state A to the state B is equal to one. As a result of comparison with the threshold value of 1.61, it is judged that the distance from the asynchronous reset state is short. Then, the operation proceeds to the step S407.

In the step S410, the state extracted in the step S407 is added to the candidates for the center state. Then, the operation proceeds to the step S407.

Now, it is assumed that the state E is extracted in the step S408.

In the step S409, comparison is made between the distance equal to 2 from the asynchronous reset state to the state E and the threshold value of 1.61. In this event, it is judged that the distance from the asynchronous reset state is long. The operation proceeds to the step S410 in which the state E is added to the candidates for the center state. The operation proceeds to the step S407.

As a result of termination of the operation of the center state candidate selecting unit 111, the distance from the asynchronous reset state is greater than the average distance of 1.61 at the states E and F. These two states are taken as the candidates for the center state.

Then, the center state selecting unit 112 selects the center state among the candidates selected by the center state candidate selecting unit 111.

Referring to FIG. 4, the operation of the center state selecting unit 112 will be described in detail.

In the step S601, calculation is made of the distances between the center state candidates. Upon calculation, those states other than the center state candidates can be used to obtain shortest paths. In case where the distances are already calculated by the center state candidate selecting unit 111, the calculation result can be used in common. Since the distances are already calculated in this example upon calculating the threshold value, the distances are used in common. In this case, the crosspoints (E, E), (E, F), (F, E), and (F, F) are extracted. The result in shown in Table 8 given above.

In the step S602, the distance from a particular state to the particular state itself is considered to be 0. The result is shown in Table 9. Unlike Table 8, the cross points between (E, E) and (F, F) are equal to 0.

In the step S603, calculation is made of a total distance for each of the candidate states for the center state. The result is shown in the column labelled "SUM" in Table 9.

In the step S604, the state having a minimum total distance is selected as the center state. From Table 9, the total distance from the state E is equal to 3 while the total distance from the state F is equal to 2. Therefore, the state F having the minimum total distance is selected as the center state.

Figure 17:
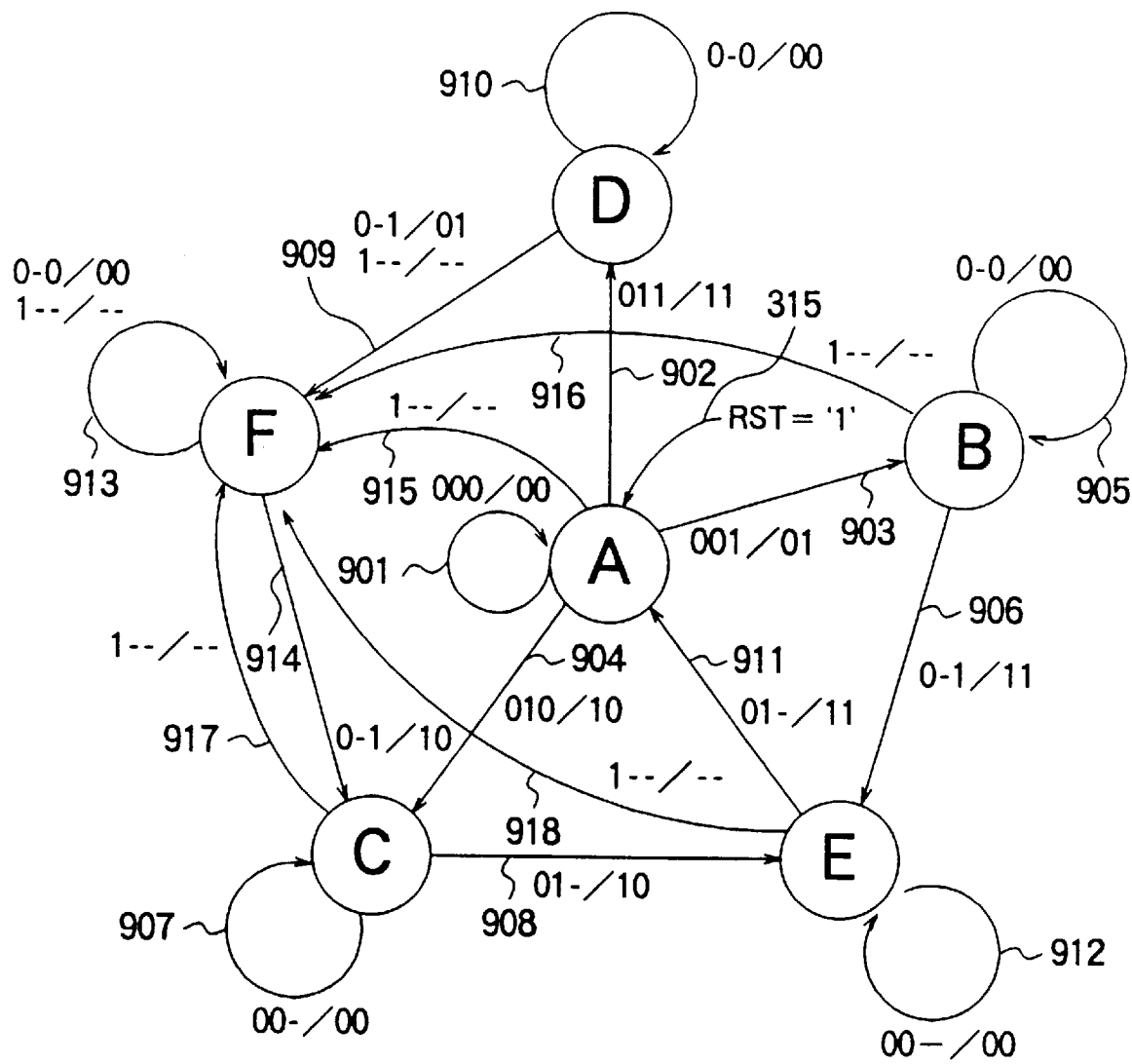
FIG. 17 is a state transition graph of the FSM after the operation of a testability improving unit in FIG. 12.

Next, the transition providing unit 113 adds the transitions from all the states to the state F selected as the center state by the center state selecting unit 112. Thus, the testability is provided by reduction of the distance. FIG. 17 shows the state transition graph of the FSM as a result of addition of the transitions.

Calculation is made of the distances among the pairs of states in the FSM in FIG. 17. The result is shown in Table 13. The average distance is equal to 1.41. Thus, it is possible to reduce the average distance which could not be shortened in the conventional system.

TABLE 13

|   | A | B | C | D | E | F |
|---|---|---|---|---|---|---|
| A | 1 | 1 | 1 | 1 | 2 | 1 |
| B | 1 | 1 | 2 | 2 | 1 | 1 |
| C | 1 | 2 | 1 | 2 | 1 | 1 |
| D | 1 | 2 | 2 | 1 | 3 | 1 |
| E | 1 | 2 | 2 | 2 | 1 | 1 |
| F | 1 | 2 | 1 | 2 | 2 | 1 |

The logic synthesis-for-testability system according to this invention is capable of improving a testability even for an FSM having an asynchronous reset state by performing effective selection of a center state considering the asynchronous reset state.

This is because the candidates for the center state exclude the asynchronous reset state allowing transition from all states and the state at a short distance from the asynchronous reset state, i.e., the state exhibiting less effect of reducing the distance due to presence of the path through the asynchronous reset state. These states are not selected as the center state.

What is claimed is:

1. A logic synthesis-for-testability system comprising:
   a memory unit for memorizing an FSM (finite state machine) description as an objective circuit description which is logically synthesized, said FSM description having a plurality of states; and
   a testability improving unit connected to said memory unit for improving testability of said FSM description by reducing an average distance between all pairs of said plurality of states;
   said testability improving unit comprising:
   a center state selecting means connected to said memory unit for selecting a center state from candidate states of said plurality of states;
   transition providing means connected to said memory unit and said center state selecting means for providing, in order to reduce said average distance between all pairs of said plurality of states, said FSM description with new transitions, each of which is directed to said center state from each of said plurality of states other than said center state; and
   candidate selecting means connected to said memory unit and said center state selecting means for selecting said candidate states among said plurality of states with an asynchronous reset state of said plurality of states excluded from said candidate states.

2. A logic synthesis-for-testability system as claimed in claim 1, wherein said candidate selecting means selects said candidate states among said plurality of states with said asynchronous reset state and a near state of said plurality of states excluded from said candidate states, said near state having a distance which is calculated from said asynchronous reset state to said near state and which is shorter than a predetermined threshold value.

3. A logic synthesis-for-testability system as claimed in claim 1, wherein said candidate selecting means selects said candidate states among said plurality of states with said asynchronous reset state and near states of said plurality of states excluded from said candidate states, each of said near states having a distance which is calculated from said asynchronous reset state to each of said near states and which is shorter than a predetermined threshold value.

4. A method of improving testability of a finite state machine (FSM) description of an objective circuit, said FSM description having a plurality of states, one of said plurality of states comprising an asynchronous reset state, said method comprising:
   selecting candidate states from said plurality of states by excluding said asynchronous reset state;
   selecting a center state from only said candidate states; and
   reducing an average distance between all pairs of said plurality of states by providing said FSM description with new transitions to said center state from each of said plurality of states other than said center state.

5. The method of improving testability of a FSM description as set forth in claim 4, further comprising performing said selecting of said candidates by further excluding all of said plurality of states comprising a near state, said near state being any one of said plurality of states having a respective distance, calculated from said asynchronous reset state to said near state, shorter than a predetermined threshold value.

6. The method of improving testability of a FSM description as set forth in claim 4, further comprising performing said selecting of said candidates by further excluding all of said plurality of states comprising a near state, said near state being any one of said plurality of states having a respective distance, calculated from said asynchronous reset state to each of said near states, shorter than a predetermined threshold value.

* * * * *